(12) United States Patent
Homi et al.

(10) Patent No.: US 6,363,900 B1
(45) Date of Patent: Apr. 2, 2002

(54) SYNTHETIC RESIN-MADE INTAKE MANIFOLD AND MANUFACTURING METHOD THEREOF

(75) Inventors: Nobuyuki Homi, Higashihiroshima; Takeharu Suga, Hiroshima-ken; Hiroshi Munetoki, Kobe; Yoshihiro Kimoto, Kawanishi; Mikio Nakajima, Okazaki, all of (JP)

(73) Assignees: G P Daikyo Corporation, Higashihiroshima; Daihatsu Motor Co., Ltd., Ikeda; Toyota Jidosha Kabushiki Kaisha, Toyota, all of (JP)

( * ) Notice: Subject to any disclaimer, the term of this patent is extended or adjusted under 35 U.S.C. 154(b) by 0 days.

(21) Appl. No.: 09/386,233

(22) Filed: Aug. 31, 1999

(30) Foreign Application Priority Data

Sep. 1, 1998 (JP) .......................... 10-246986

(51) Int. Cl.⁷ .............................................. B29C 45/14
(52) U.S. Cl. ................................................. 123/184.21
(58) Field of Search .................... 264/328.7, 328.8, 264/328.11, 250; 123/184.21, 184.61, 184.34, 184.42, 184.47

(56) References Cited

U.S. PATENT DOCUMENTS

| | | |
|---|---|---|
| 4,497,287 A | 2/1985 | Schleiermacher et al. |
| 4,643,138 A * | 2/1987 | Ruf et al. ............... 123/184.34 |
| 5,063,885 A * | 11/1991 | Yoshioka ............... 123/184.34 |
| 5,445,782 A * | 8/1995 | Sadr ............................ 264/513 |
| 6,161,514 A * | 12/2000 | Ernst et al. ............. 123/184.47 |
| 6,192,849 B1 * | 2/2001 | Powell .................. 123/184.34 |

FOREIGN PATENT DOCUMENTS

| | | |
|---|---|---|
| DE | 195 46 545 A1 | 6/1997 |
| FR | 2 739 898 | 4/1997 |
| JP | 62 087315 | 4/1987 |
| JP | 2-38377 | 8/1990 |
| JP | 04 091914 | 3/1992 |
| JP | 06 344378 | 12/1994 |
| JP | 7-4830 | 1/1995 |
| JP | 10-15991 * | 1/1998 |
| JP | 10 015998 | 1/1998 |
| WO | WO 98/01280 | 1/1998 |

* cited by examiner

*Primary Examiner*—Marguerite McMahon
*Assistant Examiner*—Hyder Ali
(74) *Attorney, Agent, or Firm*—Foley & Lardner

(57) ABSTRACT

A synthetic resin-made intake manifold including a volumetric air-intake section communicating with an intake air supply source through an inlet pipe and a plurality of outlet pipes for connecting the volumetric air-intake section to cylinders of an internal combustion engine is fabricated by injection molding, by applying the die rotary injection method or die slide injection method, the volumetric air-intake section and the outlet pipes respectively, thereafter, assembling them together and joining into unity, so that a synthetic resin-made intake manifold adapted for efficient production and flexible designing or including outlet pipes of a complex shape is obtained.

6 Claims, 26 Drawing Sheets

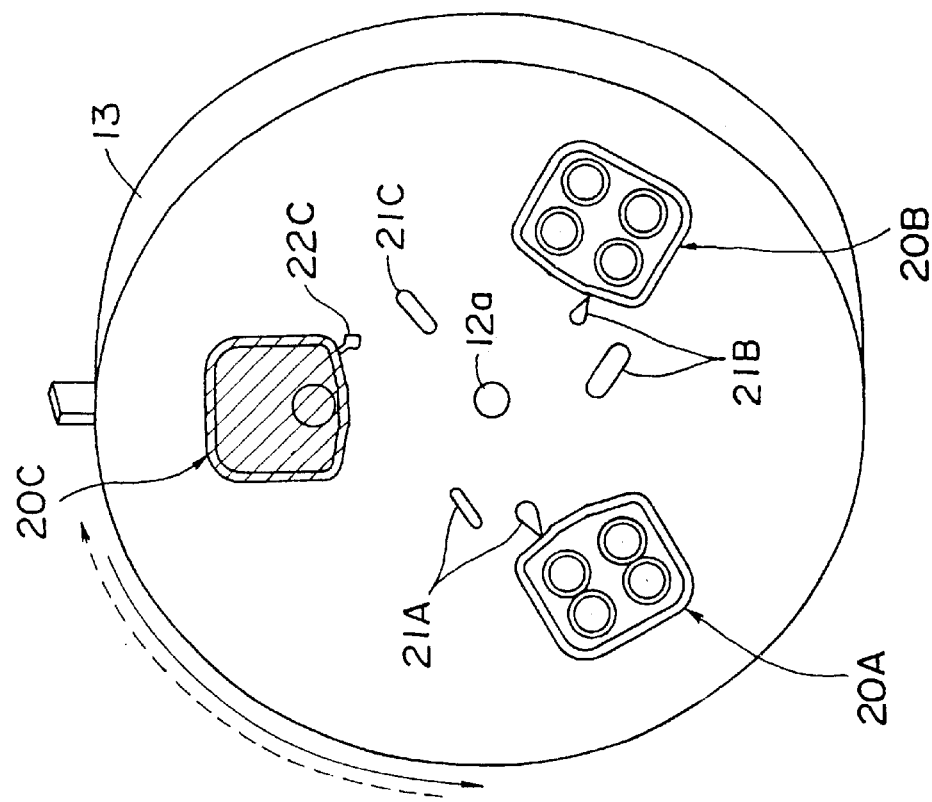
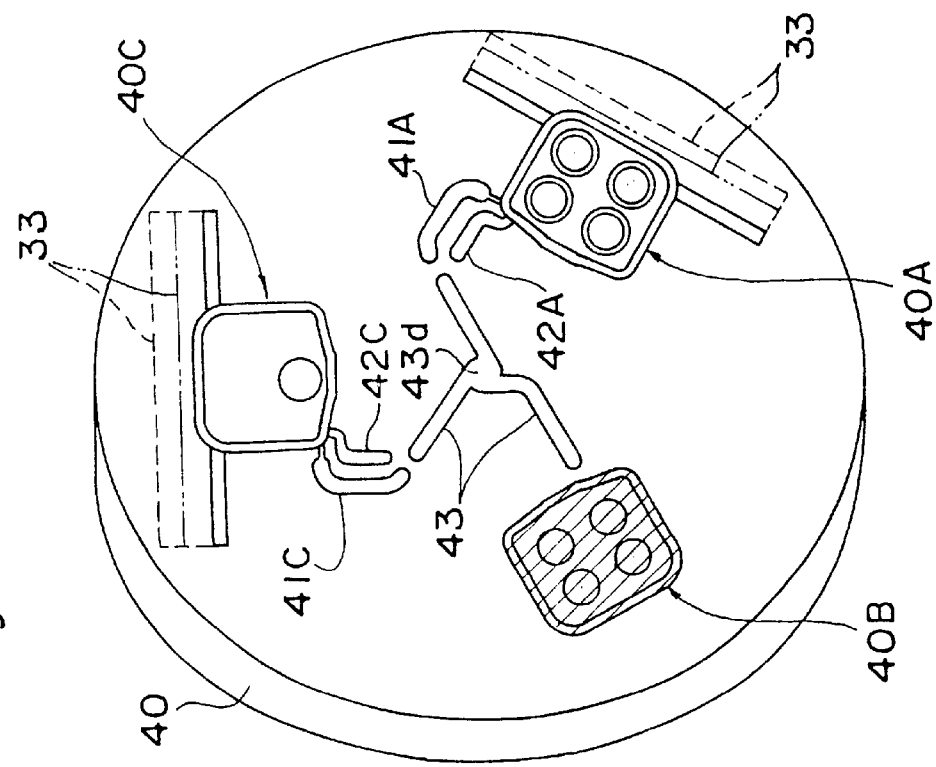
Fig. 14

SYNTHETIC RESIN-MADE INTAKE MANIFOLD AND MANUFACTURING METHOD THEREOF

BACKGROUND OF THE INVENTION

The present invention relates to a synthetic resin-made intake manifold and a manufacturing method thereof, wherein the intake manifold includes a volumetric air-intake section communicating with a intake air supply source through an inlet pipe, and a plurality of outlet pipes for connecting the volumetric air-intake section to cylinders of an internal combustion engine, at least the volumetric air-intake section and each of the outlet pipes being made of a synthetic resin.

As is widely known, an intake manifold is connected to a cylinder head of an internal combustion engine for feeding intake air into combustion chambers of individual cylinders. As such intake manifold, there is known one that includes a volumetric air-intake section (so-called surge tank) communicating with an intake air supply source through an inlet pipe and a plurality (equal to the number of cylinders) of outlet pipes for connecting the surge tank to each cylinder of the engine. Since such intake manifold is a considerably large-size component of an air-intake system, so for purpose of reducing the weight of the peripheral arrangement of the engine more than ever, it has been contemplated that the intake manifold may be formed of synthetic resin instead of conventionally used light alloy (e.g., aluminum alloy and the like).

Since the intake manifold is an air-intake system component which involves lower temperature conditions than air-exhaust system components, it is well possible to use synthetic resin (in particular, a synthetic resin of the type which is reinforced with fibers or the like) as the material.

In the prior art, when fabricating such an intake manifold from synthetic resin, conceivably, one method which would be commonly considered may be such that a pair of synthetic resin-made separate halves integrally formed of a half for a surge tank and a half for outlet pipes, previously formed from synthetic resin are brought into abutment against each other, being then joined together by applying an adhesive to their abutting surfaces or by melting thermally or by applying vibration on the abutted portion, whereby the separate halves are joined together into a finished component (intake manifold).

In manufacturing intake manifolds for mass-production automotive engines, a need exists for a manufacturing method which can assure higher production efficiency. However, in the above mentioned prior art, since forming operation for respective halves takes a lot of time, it is generally difficult to achieve further enhancement of productivity.

Another problem is that since each separate half is integrally formed of a half for a surge tank and a half for outlet pipes, even where the surge tank only or the outlet pipes only is to be design changed, the integration makes it necessary to reconstruct the molding die in its entirety, which is a large limiting factor against the task of enhancing the flexibility of designing. Therefore, for common use of a particular component, for example, surge tank, with the outlet pipe only changed, thereby to promote common utilization of the component with other types of vehicles, considerable expenditure is required with respect to the molding die.

In the recent trend toward saving space of the engine room, with respect to the intake manifold and the mounting arrangement therefor, it is required to make them more compact in size, with setting the length of the outlet pipe be a length not lower than a specified length, or the length of each outlet pipe be as much equalized length as possible, for obtaining satisfactory air-intake characteristic. To this end, it is required that good contrivance be used with respect to the outlet pipe such that the outlet pipe is made more complex in configuration, including not only a simple bending from a comparatively linear straight pipe at a specified curvature, but also a three dimensional bending consists of aforesaid simple bending with twisting applied thereto. Further, along with the size reduction of the surge tank, it is required that joint portions between a plurality of outlet pipes and the surge tank be intensively gathered in as much narrower space as possible, and in view of this fact it is inevitable that the bending configuration of the outlet pipe becomes to a complex one.

However, in above mentioned conventional method, wherein a pair of separate halves integrally formed of a half for a surge tank and a half for outlet pipes, are brought into abutment against each other and jointed together, it is virtually very difficult to meet the size reduction requirement when the outlet pipe is of such a complex shape as above mentioned. Even if the method could be applied, there is a problem that it is difficult to maintain atably high production efficiency and quality.

As a method for molding a synthetic resin-made hollow item, it is known to bring synthetic resin-made halves into abutment against each other and fill a melted resin mass into an internal passage formed along a peripheral edge of the abutted portion or a passage formed between the abutted portion and molding die wall, to thereby join the halves together to obtain a hollow molded product. Also, there is known a method in which filling molten synthetic resin into the passage is carried out, within a molding die in which separate halves are molded when they are joined together in such a way as aforesaid.

By employing such a method it is possible to ensure more stably high strength of bond between the so jointed halves and good sealing performance of the abutted portion as compared with the prior art practice in which such joining is carried out by adhesion or thermal melting.

For example, in Japanese Patent Publication No. 2-38377 there is disclosed a molding die construction including one pair of metal dies which is basically such that one of the metal dies has a male molding portion and a female molding portion for molding one set of separate halves, whereas the other metal die has a female molding portion and a male molding portion provided in opposed relation to the molding portions of the one metal die. In this conjunction, a method using such a pair of molding die (so-called die slide injection (DSI) method) is also disclosed such that after separate halves are simultaneously molded (injection molded), one of the metal die is caused to slide relative to the other metal die so that separate halves remaining in respective female molding portions are brought into abutment with each other, with melted resin being injected onto the peripheral edge of the abutted portion to join the two halves together.

According to this DSI method, productivity can be considerably enhanced as compared with conventional method in which molding of separate halves and abutting/jointing of the halves are carried out at separate stages.

For further improvement of production efficiency, in Japanese Patent Publication No. 7-4830, for example, there is disclosed a rotary injection molding die construction including a combination of molding dies which is basically such that the molding dies are adapted to be opened and closed in relation to each other in such a way that one of the molding dies is rotatable over a predetermined angle relative to the other, each molding die having a molding portion to constitute a rotary injection molding die construction, each die consisting of at least one male molding portion and two female molding portions arranged in a repetitive sequence of male/female/female in the direction of rotation for each rotational run over the predetermined angle. In this conjunction, there is also disclosed a rotary injection molding method (so-called die rotary injection (DRI) method) wherein by using such a molding die assembly, it is possible to carry out molding of separate halves and joining of a pair of abutted halves during each rotational movement (for example, forward/reverse movement), thereby to obtain a finished product for each rotational movement.

Thus, by using the DRI method or DSI method it is possible to obtain high productivity and good quality in a stable condition; however, where separate halves are integrally formed of a half for a surge tank and a half for outlet pipes in applying such a method, as in the case of the prior art, the molding die is of a very large in size, and this causes a problem of lack of practical usefulness.

SUMMARY OF THE INVENTION

The present invention has been developed in view of above mentioned problems and, therefore, it is a primary object of the invention to provide a synthetic resin-made intake manifold adapted for efficient production and flexible designing or including outlet pipes having a complex shape, by applying the DRI method or DSI method, and to provide a manufacturing method of the aforesaid synthetic resin-made intake manifold.

Therefore, according to a first aspect of the present invention, there is provided a method for manufacturing a synthetic resin-made intake manifold including a volumetric air-intake section communicating with an intake air supply source through an inlet pipe, and a plurality of outlet pipes connected at one end to cylinders of an internal combustion engine through a mounting member and at the other end to the volumetric air-intake section, the volumetric air-intake section and the outlet pipes being formed of a synthetic resin, wherein the volumetric air-intake section and the outlet pipes are respectively injection molded by the die rotary injection method or die slide injection method and are then assembled together and jointed into unity.

In the synthetic resin intake manifold manufacturing method of the first aspect of the present invention, the volumetric air-intake section and the outlet pipes are separately injection molded by a so-called die rotary injection (DRI) method or die slide injection (DSI) method, and then the former and the latter are assembled and joined together into unity. Therefore, the DRI method or DSI method can be comparatively easily employed in manufacturing the volumetric air-intake section and individual outlet pipes which are to be made of synthetic resin without involving any difficulty (that is, without involving any impractical size increase with respect to the molding die). This makes it possible to steadily obtain higher productivity and higher quality as compared with the prior art.

Further, since the volumetric air-intake section and outlet pipes are separately molded, where only volumetric air-intake section or outlet pipes are to be changed in design, it is only necessary to change separate molding dies, and this provides for design flexibility with respect to intake manifold. Therefore, for common use of a particular component, for example, volumetric air-intake section, with outlet pipes only changed, thereby to promote common utilization of the component with other types of vehicles, it can be comparatively easily achieved with a smaller cost of molding die. Furthermore, the present invention is adapted for ready application even where outlet pipes are bent pipes of a complex shape.

Also, according to a second aspect of the invention based on the first aspect of the invention, the mounting member is integrally formed with the volumetric air-intake section during the process of injection molding of the volumetric air-intake section.

In the synthetic resin-made intake manifold manufacturing method of the second aspect of the invention, basically it is possible to achieve the same effect as obtained in the first aspect of the invention. In particular, since a mounting member for connecting one end of each outlet pipe is integrally molded with the volumetric air-intake section during the process of injection molding of the volumetric air-intake section, the number of components can be reduced and productivity can be further improved.

Further, according to a third aspect of the invention, there is provided a synthetic resin-made intake manifold including a volumetric air-intake section communicating with an intake air supply source through an inlet pipe, and a plurality of outlet pipes connected at one end to cylinders of an internal combustion engine through a mounting member and at the other end to the volumetric air-intake section, the volumetric air-intake section and the outlet pipes being formed of a synthetic resin, the manifold, wherein the volumetric air-intake section and the outlet pipes are respectively injection molded by the die rotary injection method or die slide injection method and are then assembled together and jointed into unity.

In the synthetic resin-made intake manifold of the third aspect of the invention, since the volumetric air-intake section and the outlet pipes which are injection molded by a so-called die rotary injection (DRI) method or a die slide injection (DSI) method are assembled and joined together into unity, the DRI method or DSI method can be comparatively easily employed in manufacturing the volumetric air-intake section and individual outlet pipes which are to be made of synthetic resin without involving any difficulty (that is, without involving any impractical size increase with respect to the molding die). This makes it possible to steadily obtain higher productivity and higher quality as compared with the prior art.

Further, since the volumetric air-intake section and outlet pipes are separately molded, where only volumetric air-intake section or outlet pipes are to be changed in design, it is only necessary to change separate molding dies, and this provides for design flexibility with respect to intake manifold. Therefore, for common use of a particular component, for example, volumetric air-intake section, with outlet pipes only changed, thereby to promote common utilization of the component with other types of vehicles, it can be comparatively easily achieved with a smaller cost of molding die. Furthermore, the present invention is adapted for ready application even where outlet pipes are bent pipes of a complex shape.

Furthermore, according to a fourth aspect of the invention based on the third aspect of the invention, the mounting member is integrally formed with the volumetric air-intake section.

In the synthetic resin-made intake manifold of the fourth aspect of the invention, basically it is possible to achieve the same effect as obtained in the third aspect of the invention.

In particular, since a mounting member for connecting one end of each outlet pipe is integrally molded with the volumetric air-intake section during the process of injection molding of the volumetric air-intake section, the number of components can be reduced and productivity can be further improved.

Furthermore, according to a fifth aspect of the invention based on the third or fourth aspect of the invention, each of the outlet pipes is formed of a bent pipe and opposite ends of its axis form an angle of about 180 degree or more in a bending direction of the outlet pipe.

In the synthetic resin-made manifold of the fifth aspect of the invention, basically it is possible to achieve same effect as obtained in the third or fourth aspect of the invention. In particular, since each of the outlet pipes is formed of a bent pipe and opposite ends of its axis form an angle of about 180 degree or more in a bending direction of the outlet pipe, it is possible to make the construction of the intake manifold and the mounting structure more compact, with setting the length of each outlet pipe to be a length not lower than a certain level, or with setting the lengths of outlet pipes to be as much equalized as possible in length in order to provide good air-intake characteristic.

BRIEF DESCRIPTION OF THE DRAWINGS

FIG. 14 is an explanatory view of the mold in front elevation showing a stationary rotor and a movable die plate in opened condition;

DESCRIPTION OF PREFERRED EMBODIMENTS

One embodiment of the present invention will now be described in detail with reference to the accompanying drawings.

Figure 1:
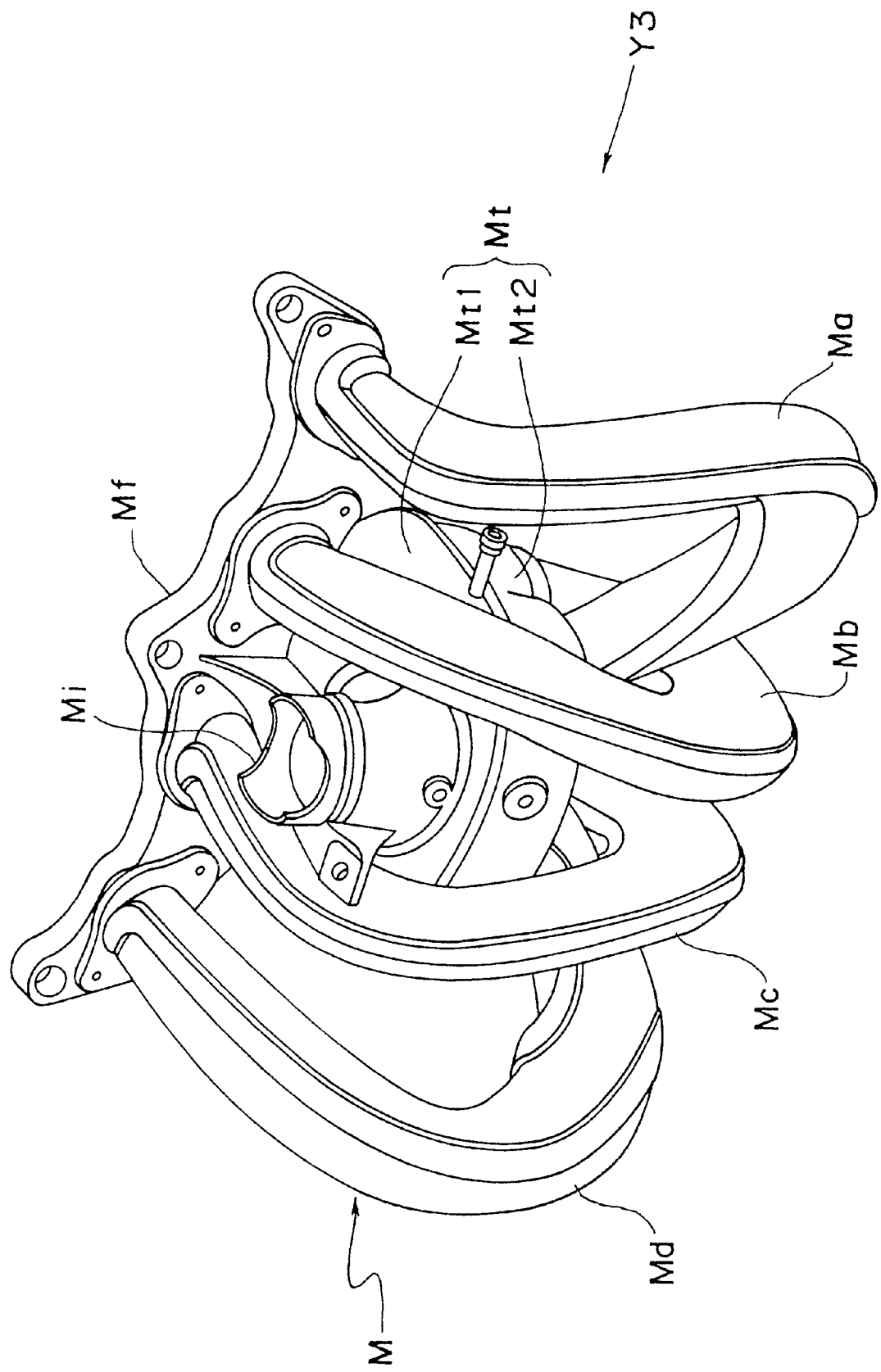
FIG. 1 is a general view in perspective of an intake manifold according to one embodiment of the present invention.
Figure 2:
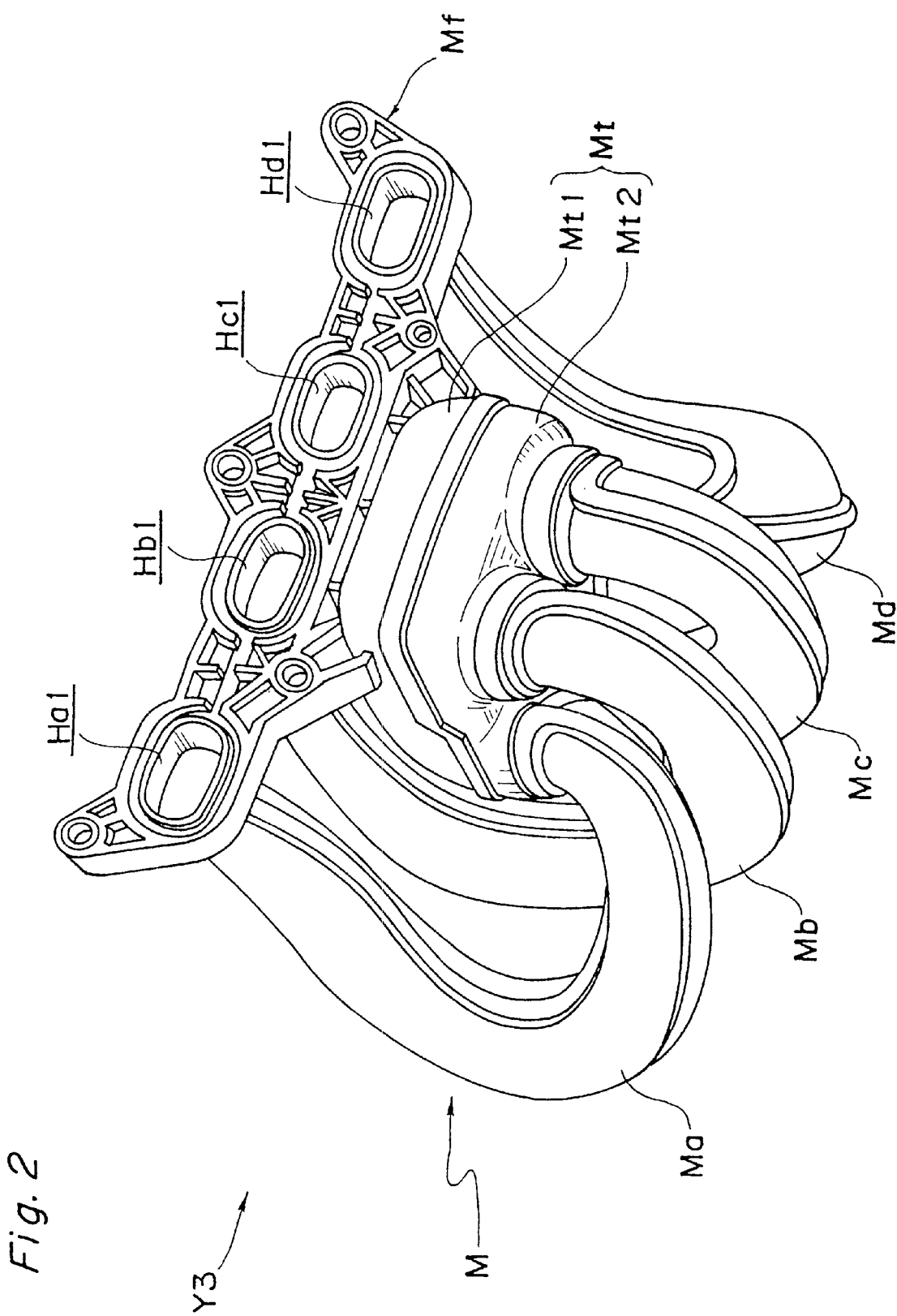
FIG. 2 is a general view in perspective of the intake manifold as viewed in a direction different from that in FIG. 1.
Figure 3:
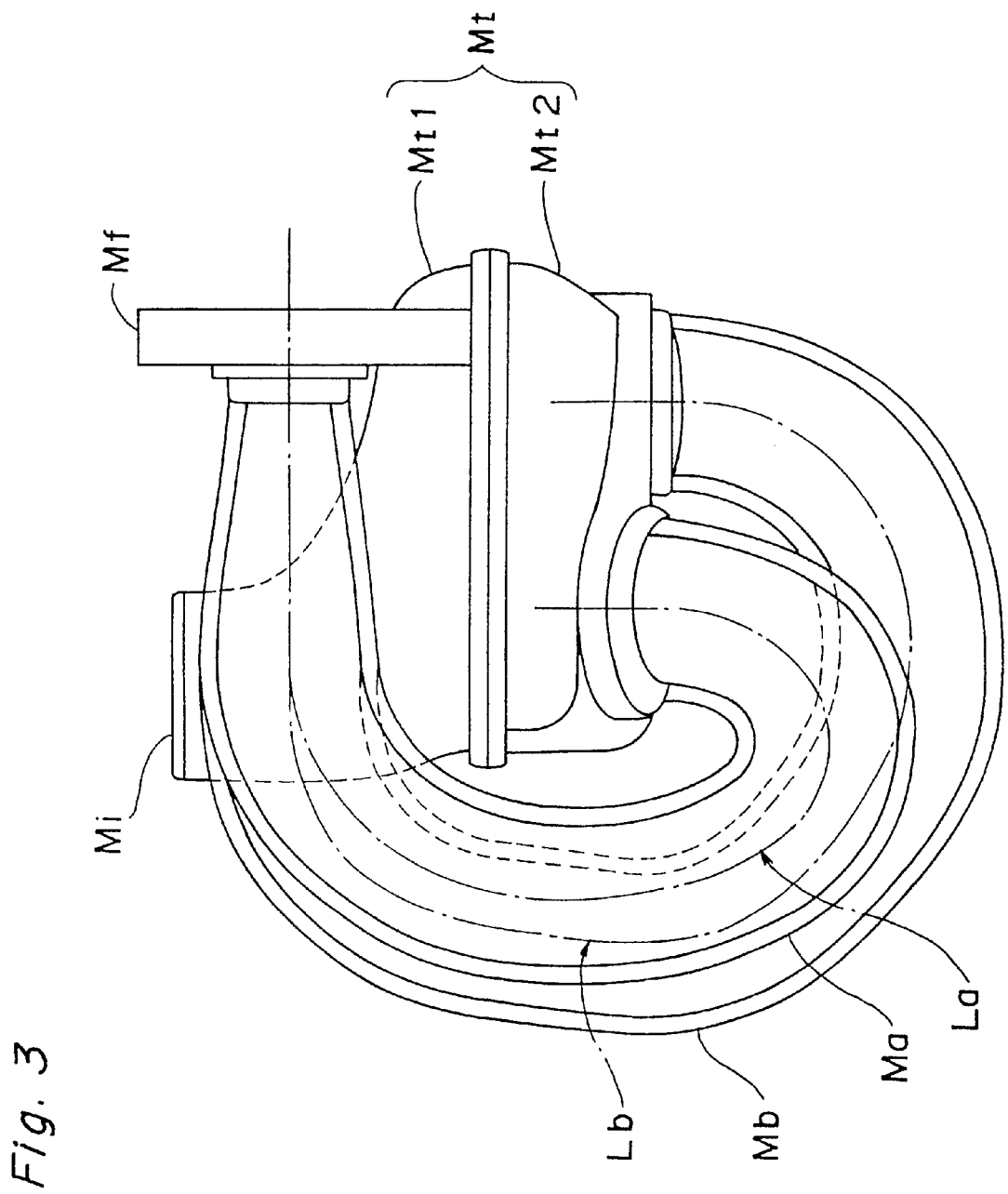
FIG. 3 is an explanatory view shown in side elevation as viewed in a direction shown by arrow Y3 in FIG. 1 or FIG. 2.

FIGS. 1 and 2 are perspective views in side elevation of a synthetic resin-made intake manifold M of the present embodiment as seen respectively in different directions. FIG. 3 is an explanatory side view as seen in the direction of arrow Y3 in FIGS. 1 and 2.

The intake manifold M includes a surge tank Mt operative as a volumetric air-intake section communicating with an intake air supply source through an inlet pipe Mi, and a plurality (a number equal to the number of cylinders of the engine: 4 in this embodiment) of outlet pipes Ma–Md. The intake manifold M is to be obtained through the process of injection resin molding the surge tank Mt and respective outlet pipes Ma–Md, and then assembling and jointing them into unity.

The inlet pipe Mi, not specifically shown, is connected to an equipment provided on upstream-side of an air-intake system, such as air cleaner, in order to introduce an air flow from outside the vehicle passing through the upstream-side equipment into the surge tank Mt.

Respective outlet pipes Ma–Md are connected at one end (downstream-side end) to respective corresponding cylinders of the engine (not shown) through a port flange Mf operative as a mounting member and, at the other end (upstream-side end), to the surge tank Mt. The port flange Mf is formed with openings Ha1–Hd1 corresponding to the cylinders of the engine, and downstream-side ends of respective outlet pipes Ma–Md are set on the back side of the port flange Mf, so that openings of passages defined by outlet pipes Ma–Md coincide with the openings Ha1–Hd1.

Figure 6:
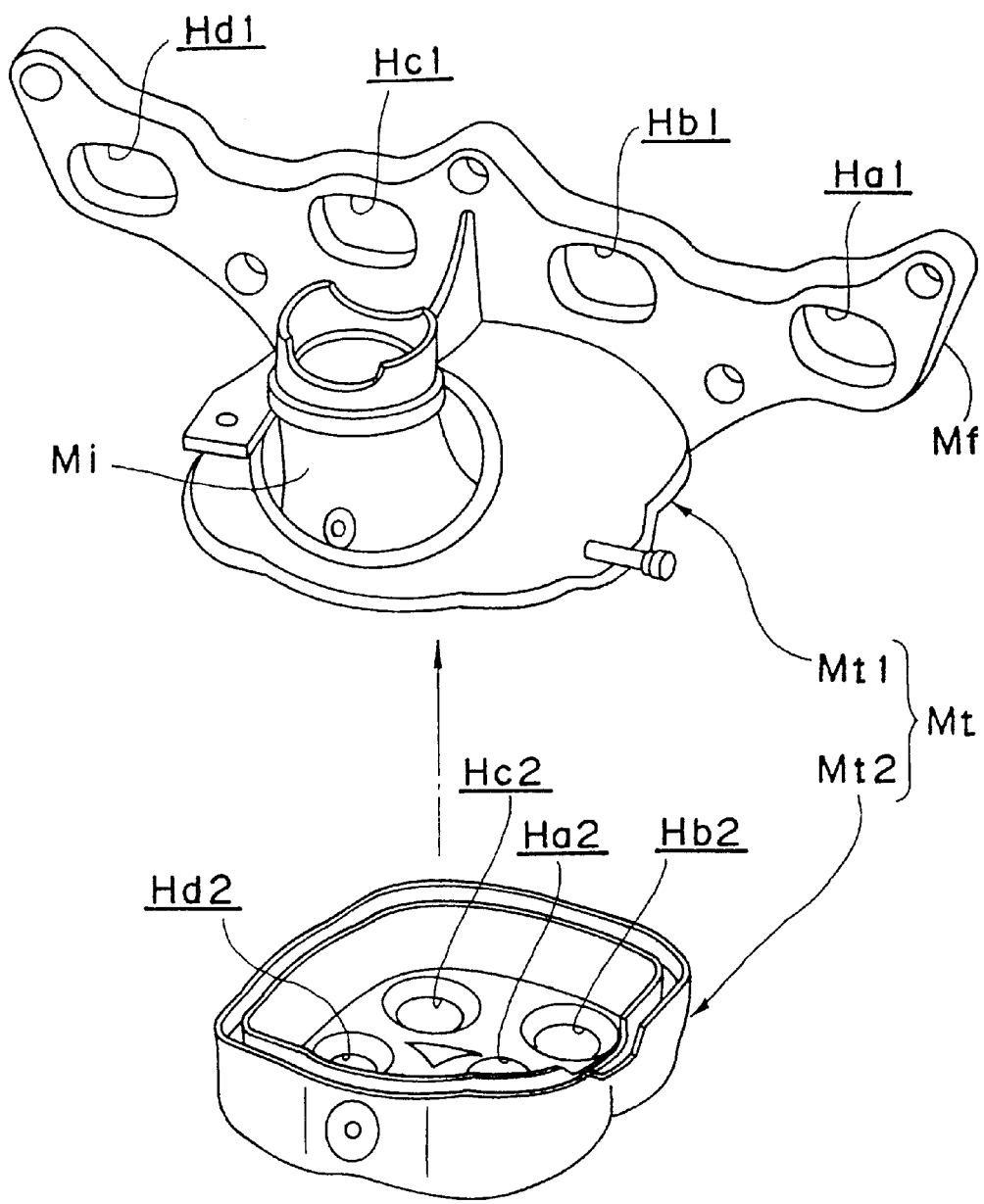
FIG. 6 is an exploded view in perspective of a surge tank of the intake manifold.
Figure 7:
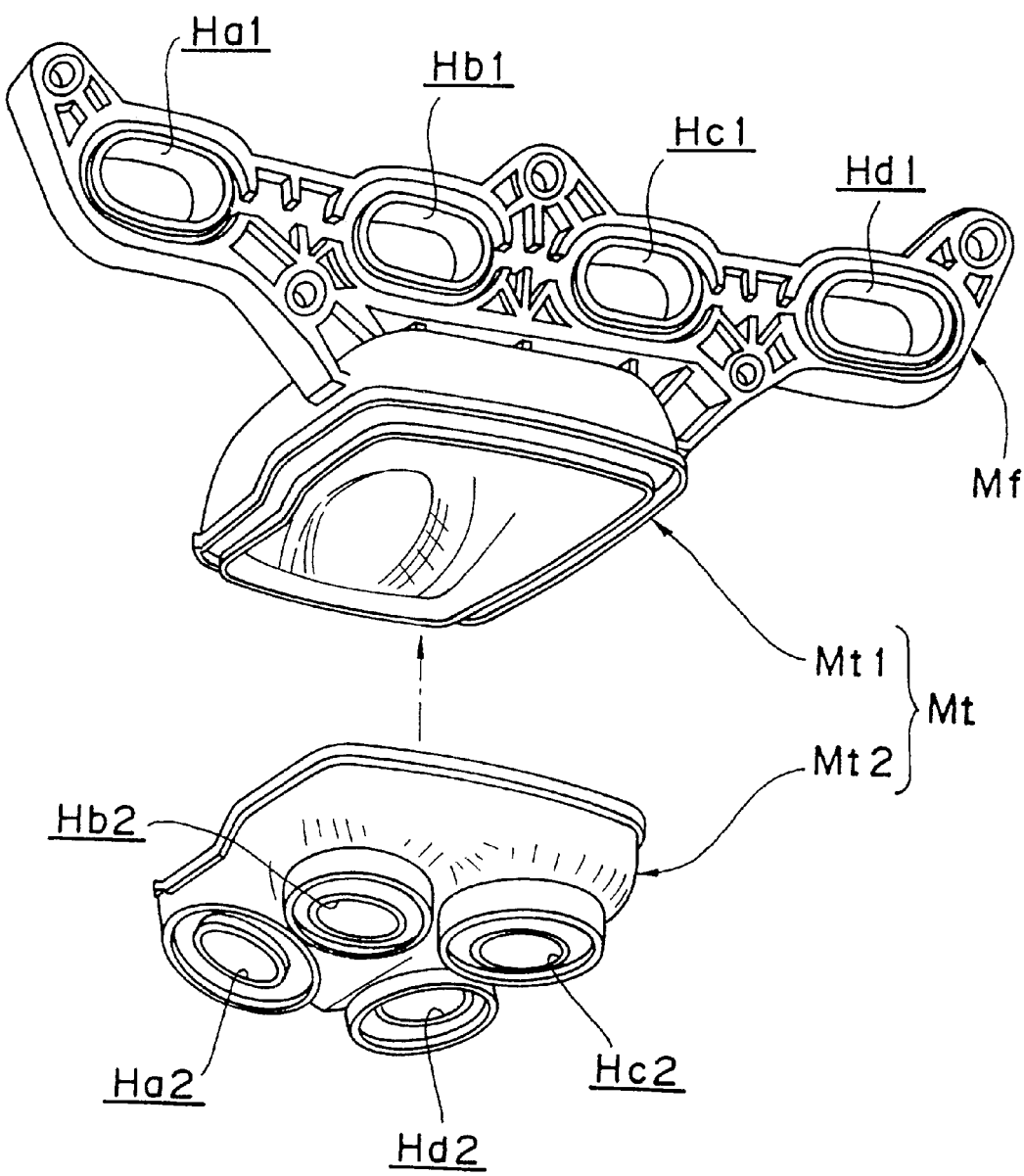
FIG. 7 is a perspective view of the surge tank shown when viewed in a direction different from that in FIG. 6.

The surge tank Mt consists of an upper half Mt1 and a lower half Mt2 as shown in FIGS. 6 and 7, the lower half Mt being formed with four openings Ha2–Hd2.

Upstream ends of respective outlet pipes Ma–Md are respectively set on the underside of the surge tank Mt (that is, underside of the lower half Mt2) so that openings of the passages formed by the outlet pipes Ma–Md coincide with the openings Ha2–Hd2.

The surge tank Mt is more preferably such that upper and lower halves are respectively molded by so-called die rotary injection (DRI) method using a pair of rotary injection molding dies capable of relative rotational movement and such that the upper and lower halves are molded by using said molding die assembly, then butted and joined into unity by using the same molding die. In this way, a finished hollow component (surge tank Mt) consisting of the joined two halves is obtained for each rotation movement of the molding die. The outlet pipes Ma–Md are each comprised of a pair of halves combined together and, more preferably, a finished hollow component (outlet pipe) formed by joining the separate halves by the DRI method can be obtained for each rotational movement of the molding die.

Figure 8:
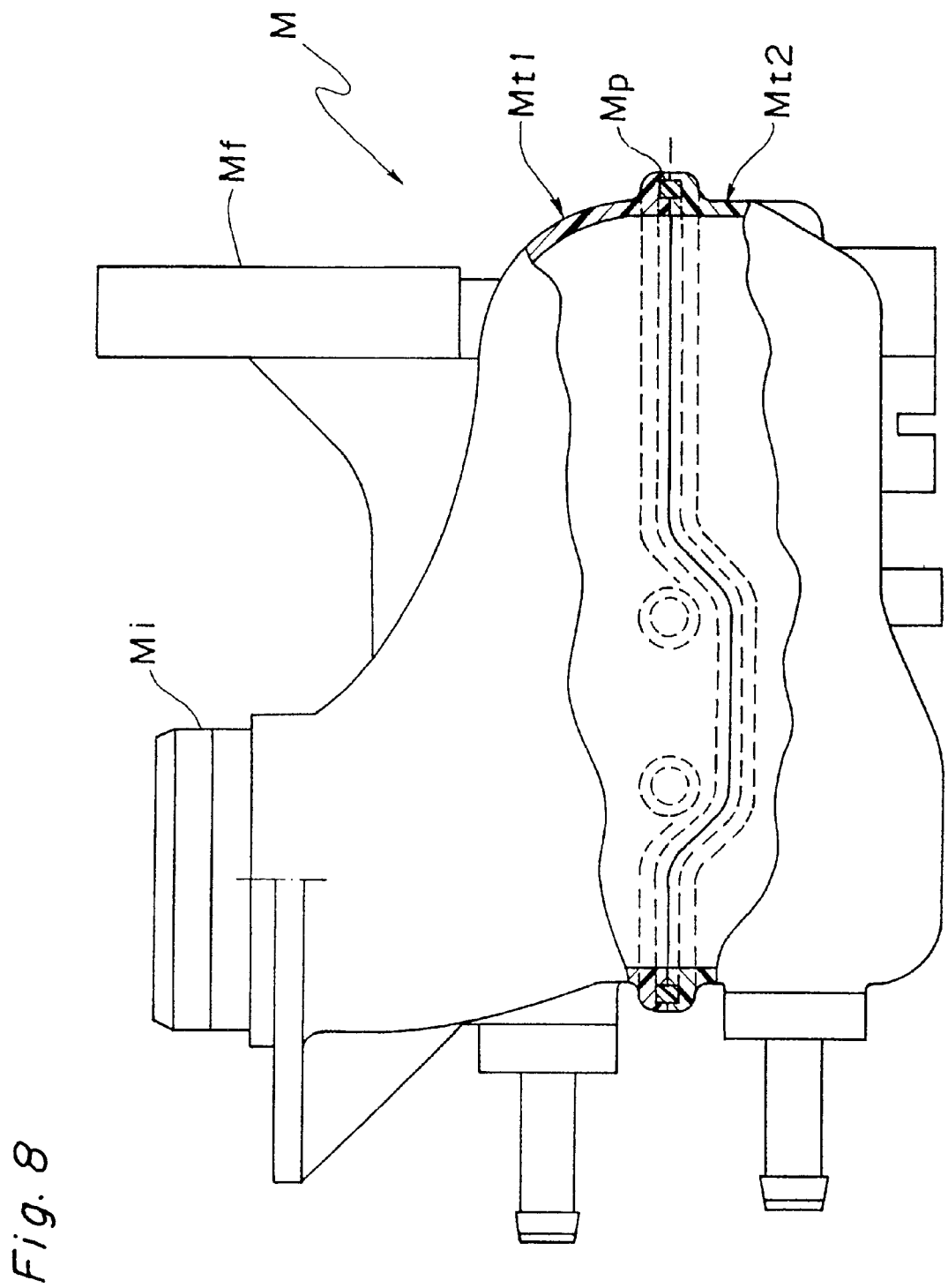
FIG. 8 is a fragmentary explanatory view in vertical section of the intake manifold.
Figure 9:
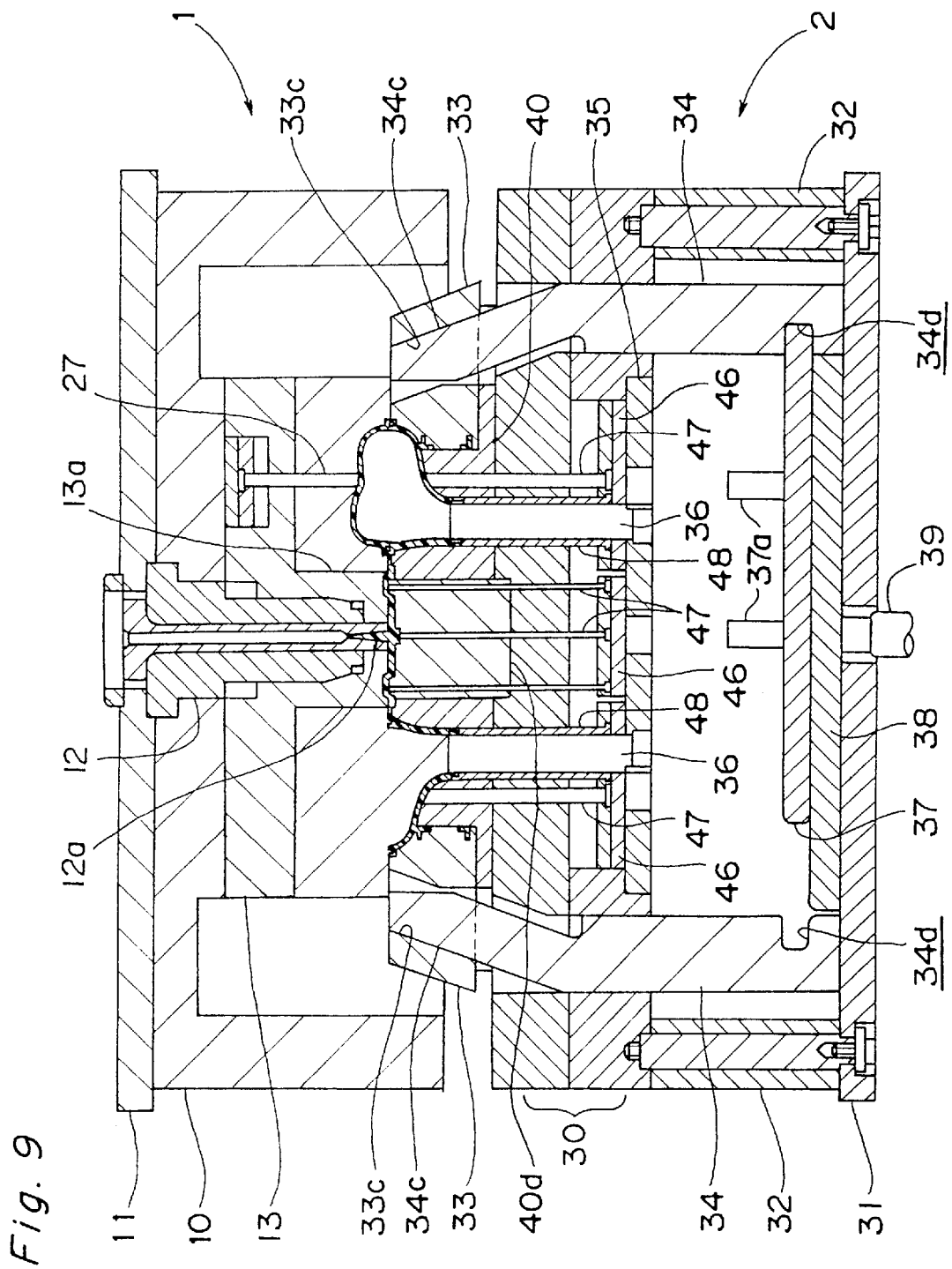
FIG. 9 is an explanatory view in vertical section taken along line Y1—Y1 in FIG. 15, showing a mold in clamped condition for forming the surge tank of the intake manifold.

In the abutted portion of the upper and lower halves, when a similar portion in the case of surge tank Mt is exemplified, as shown in FIG. 8, there is provided a channel-like interior passage Mp of closed section which is formed along outer periphery of abutting surface of upper half Mt1 and lower half Mt2, preferably defined by wall portions of the halves Mt1 and Mt2, such that after the upper and lower halves Mt1, Mt2 are brought into abutment with each other, a resin mass (a secondary resin) for joining them together is filled into the interior passage Mp.

The interior passage Mp may be configured to have a closed sectional profile defined by wall portions of the halves Mt1 and Mt2 as above described; however alternatively, it may be so arranged that while the interior passage is held in a partially opened condition at the time when the halves are brought into abutment against each other, and by setting the halves in a specified molding die, the opening is closed by die surface of the molding die so that a closed sectional configuration is formed.

Not specifically shown, though, with respect to outlet pipes Ma–Md, an interior passage is provided in the abutted portion of the halves, so that the halves are joined together by filling a secondary resin into the interior passage.

Figure 5:
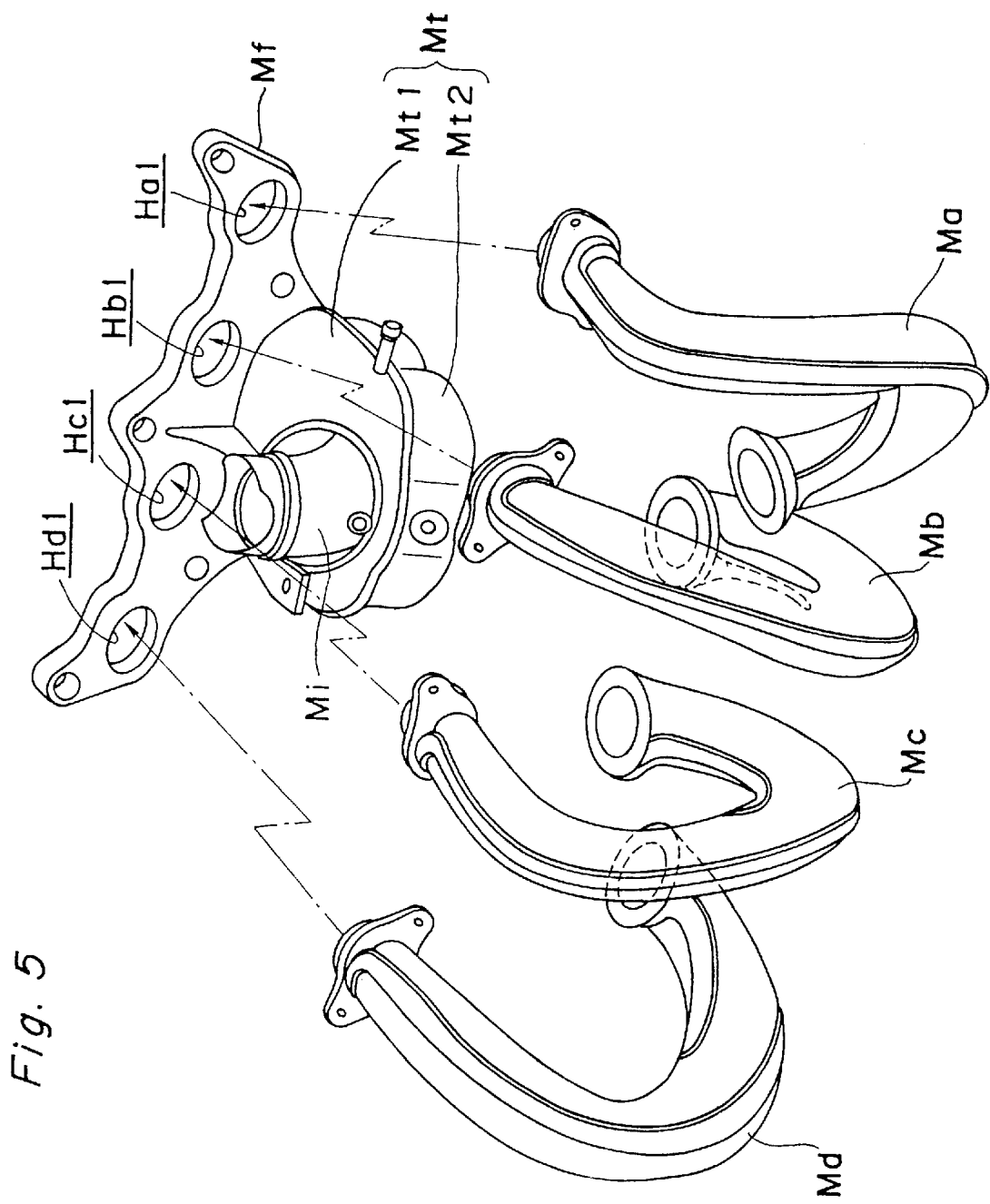
FIG. 5 is an exploded view in perspective of the intake manifold.

Mounted to the surge tank Mt obtained as a finished product according to the DRI method as above mentioned are respective outlet pipes Ma–Md obtained likewise according to DRI method, as shown in FIG. 5, so that the outlet pipes are joined, at the upstream end, to the port flange Mf and, at the downstream end, to the lower half Mt2.

The method and apparatus for fabricating the outlet pipes Ma–Md and a surge tank Mt will be described later in detail.

Figure 4:
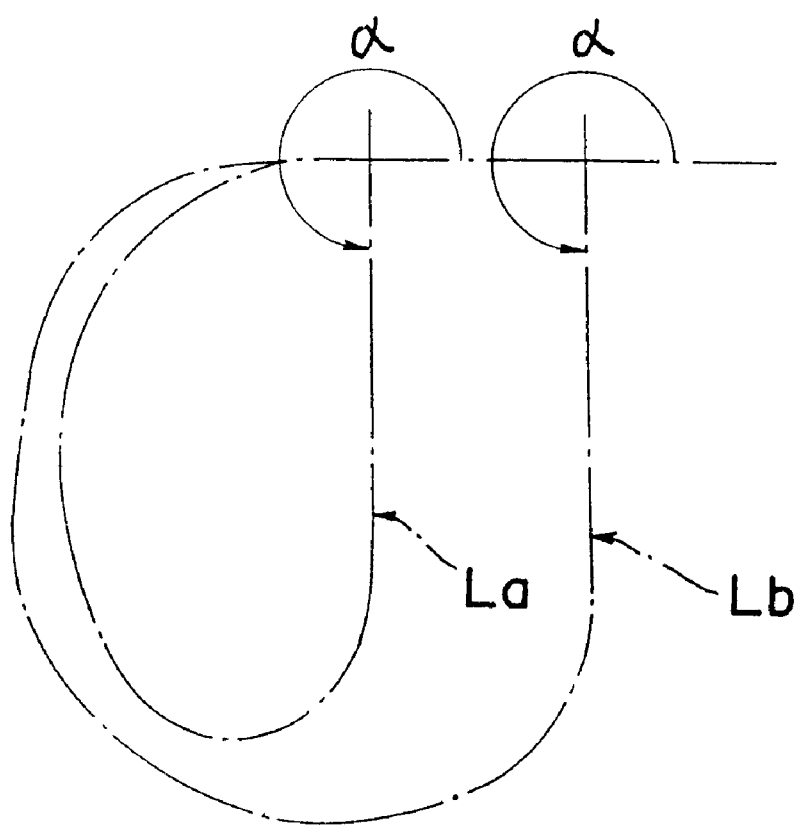
FIG. 4 is an explanatory view schematically showing the angle formed by opposite end portions of the axis of the outlet pipe of the intake manifold as viewed in side elevation.

In the present embodiment, the outlet pipes Ma–Md are each comprised of a curved pipe, and, as FIG. 4 shows schematically, opposite ends of respective axes of the outlet pipes (axes La, Lb of outlet pipes Ma, Mb only are shown in FIGS. 3 and 4; outlet pipes Mc, Md are set in laterally symmetrical relation to outlet pipes Mb, Ma) form a specified angle $\alpha$ of about 180 degree or more (in the present embodiment $\alpha$=about 270 degree) in the direction of bend as viewed in side elevation.

Therefore, with setting the length of respective outlet pipe Ma–Md to be a specified length or more, or with setting the outlet pipes Ma–Md to be as much equalized as possible in length in order to provide good air-intake characteristic, the intake manifold M and a mounting arrangement therefor can be made more compact.

In the present embodiment, more preferably, the port flange Mf is integrally molded with the surge tank Mt (specifically, during the process of molding upper half Mt1 of the surge tank Mt).

In this way, the port flange Mf, i.e. a mounting member for connecting respective outlet pipes Ma–Md at one end to cylinders of the engine is molded integrally with the surge tank Mt during the process of injection molding of the surge tank Mt and, therefore, the number of necessary components can be reduced, which results in further improvement of productivity.

Next, the method of fabricating the intake manifold M will be explained. First, the construction of a molding die to be used in manufacturing (molding) the surge tank Mt, that is, a molding die for so-called die rotary injection (DRI) molding is explained.

FIGS. 9 to 13 are explanatory views in vertical section showing molding dies employed in molding the surge tank. As may be well appreciated from FIGS. 9, 10 and 13, the molding die comprises a stationary die 1 connected to a molding machine (for example, an injection molder, not shown) and a movable die 2 which carries out opening/closing operation in relation to the stationary die 1. As will be hereinafter described in detail, the stationary die 1 is provided with a pivotal mechanism for pivotally moving a specified portion including a molding portion of the die.

In FIGS. 9 to 13, the stationary die 1 and the movable die 2 are shown as being mounted on upper and lower sides; however, the arrangement of the dies 1, 2 as actually mounted to the molding machine (not shown) is not limited to such vertical arrangement, but the dies may, for example, be so disposed as to be used in horizontally (right and left) arranged in opposed relation for use.

The stationary die 1 includes a base plate 11 fixed to a body portion 10, a sprue bushing 12 fixed centrally to the base plate 11 and body portion 10, and a rotor 13 disposed coaxially with the sprue bushing 12. An injection head (not shown) of the molding machine is fixed to the sprue bushing 12.

The rotor 13 is basically configured to have a disc shape and has a center portion 13a projecting in a cylindrical fashion. The sprue 12a of the sprue bushing 12 is open on the surface of the center projection 13a.

Figure 13:
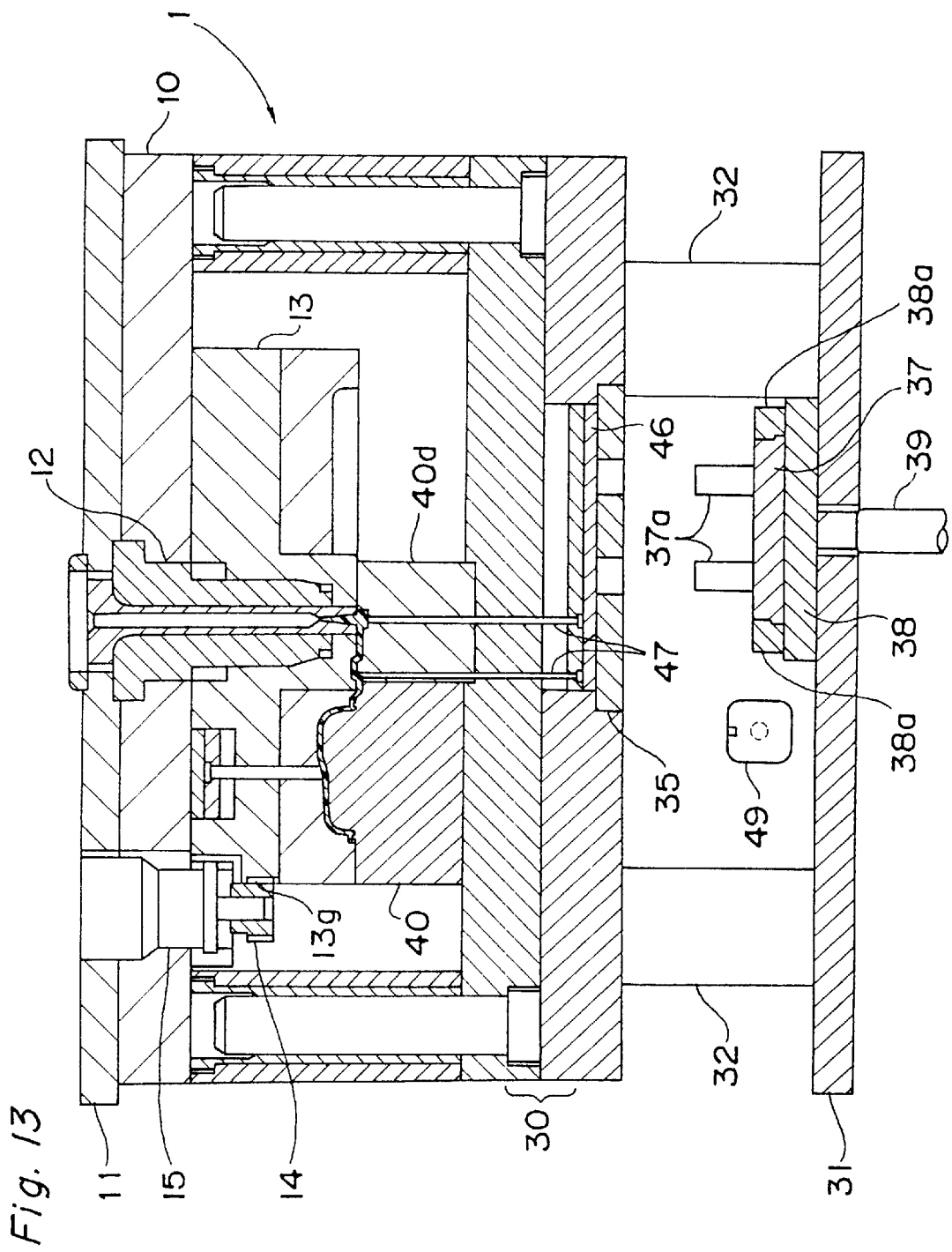
FIG. 13 is an explanatory view in vertical section taken along line Y2—Y2 in FIG. 15, showing the mold in clamped condition.

As may be well appreciated from FIG. 13, on the outer periphery of the rotor 13, there is formed a toothed portion 13g which goes in mesh engagement with a drive gear 14 disposed at an adjacent location. The drive gear 14 is connected to a drive power source 15, for example, a hydraulic motor, such that as the drive gear 14 is rotated by the drive power source 15, according to the direction of the rotation the number of turns of the drive gear 14, the rotor 13 rotates over a predetermined angle (preferably 120 degree in the present embodiment) in a predetermined direction.

That is, the toothed portion 13g of the rotor 13, the drive gear 14, and the drive power source 15 constitute rotary means for rotating the rotor 13 over a predetermined angular range (120°) in relation to the movable die 2.

Whilst, the movable die 2 includes a base plate 31 disposed in parallel to the body portion 30, and a die plate 40 fixed to the body portion 30. The die plate 40 includes a basic portion of the molding section to be described hereinafter. The body portion 30 and base plate 31 are connected, for example, to a hydraulic drive means (not shown) so as to be adapted for opening/closing movement relative to the stationary die 1 at predetermined time intervals. It is noted that plural spacer blocks 32 are interposed between the body portion 30 and the base plate 31.

Further, the movable die 2 includes a slide die 33 slidable along the die plate 40 in a direction orthogonal to the opening/closing direction of the movable die 2, and a rod-like slide guide 34 for driving the slide die 33 in response to an opening/closing operation of the movable die 2.

The slide die 33 corresponds to a port flange Mf to be integrally formed with the upper half Mt1 of a molded product (surge tank) Mt, and its core portion 33a (see FIGS. 11 and 12) corresponds to openings Ha1–Hd4 of the port flange Mf. A front end portion of core member 36, fixed to a body support plate 35 for the movable die 2, corresponds to the inlet pipe Mi of the molded product Mt.

The slide die 33 and slide guide 34, as will be hereinafter described, are provided within the movable die 2 at two locations, namely, at a location where the upper half Mti is molded and at other location where upper and lower halves Mt1 and Mt2, brought into abutment with each other, are joined by a secondary resin mass.

At one end side of the slide guide 34 there is formed a tapered portion 34c which is in engagement with a tapered bore 33c of the slide die 33. Whilst, at the other end side of the slide guide 34 there is formed a recessed portion 34d to be engaged by a guide drive plate 37 which is adapted to engage one of the slide guides 34.

The guide drive plate 37 is supported at its rear surface side by. a back plate 38. As shown in FIG. 13, a pair of guide rails 38a is fixed to the back plate 38 for guiding slide movement of the guide drive plate 37 along the back plate 38.

The guide drive plate 37 moves along the guide rails 38a as it is driven to move in a direction along the back plate 38 by drive means 49, such as hydraulic cylinder (see FIG. 5), so that its engagement with slide guide 34 is switched for change (that is, from or to engagement with which one slide guide 34, right or left, engages).

The switching of the engagement of the guide drive plate 37 with the slide guide 34 is carried out by controlling the operation of the drive means 49 in response to a control signal from a controller (not shown) of the molding apparatus and in corresponding relation to the rotational movement of the rotor 13.

Connected to the rear surface of the back plate 38 is a piston rod 39 of a hydraulic drive cylinder (not shown), for example, which extends and contracts in the same direction as the direction in which the movable die 2 operates of die opening and closing direction, the piston rod 39 extending through the base plate 31. As the piston rod 39 extends and contracts, the slide guide 34 can be driven (forward and backward) through the back plate 38 and guide drive plate 37 in response to the extend/contract movement of the piston rod 39.

That is, the drive cylinder (not shown), the piton rod 39 thereof, the back plate 38, the guide drive plate 37, and the slide guide 34 constitute core drive means for driving a core portion 33a of one of the slide dies 33, right or left, in response to the opening and closing operation of molding dies 1, 2.

Inside the body portion 30 of the movable die 2, there are provided ejector pins 47 and ejector rings 48 in plurality (3 in number) which are respectively mounted on ejector plates 46. It is noted that the ejector rings 48 are to eject (push upward) a molded item Mt and/or a pipe end of an inlet pipe Mi of upper half Mt1 and are arranged so as to surround the outer periphery of the core member 36.

With respect to the three ejector plates 46, they are so arranged that when the guide drive plate 37 is driven (advanced) toward the body portion 30 of the movable die 2, two projecting pins 37a which project upward from the guide drive plate 37 are extended through corresponding holes of the body support plate 35 to press the ejector plate 46 at the back side so that two of the three ejector plates 46 are pushed upward. Which two of the three ejector plates 46 are to be pushed upward is changed over according to the state of engagement of the guide drive plate 37 with the slide guide 34. The state of engagement between the guide drive plate 37 and the slide guide 34, as already mentioned, is determined by the guide drive plate 37 being driven by the drive means 49 (see FIG. 13) in a direction extending along the back plate 38 so that it goes into engagement with a recess 34d, of one of the right and left slide guides 34.

That is, the drive cylinder (not shown), the piston rod 39 thereof, the back plate 38, the guide drive plate 37, the projecting pins 37a, and three ejector plates 46 constitute eject drive means for driving one of ejector pin 47 and ejector ring 48 in response to the opening and closing operation of molding dies 1, 2.

The drive means 49 (see FIG. 13) operatively controlled by a control signal from the controller (not shown) of the molding apparatus, a guide drive plate 37 slidably supported on the back plate 38, and a recessed portion 34d of the slide guide 34 constitute switching means which switch over the engagement of the opening and closing mechanism of the molding die 1, 2 with the core drive means and eject drive means according to the rotational movement of the rotor 13, and which switch over the core portion 33a of the slide die 33 and the eject means to be driven.

The slide guide 34 is in its initial position when the movable die 2 is in its closed condition (see FIG. 11) in relation to the stationary die 1, and no driving force is applied to the slide die 33; thus the slide die 33 is positioned in a molding position.

After completion of molding operation and even at the time of die opening (see FIG. 10), the slide guide 34 remains stationary at its initial position so that the slide die 33 is kept at a molding position.

Figure 11:
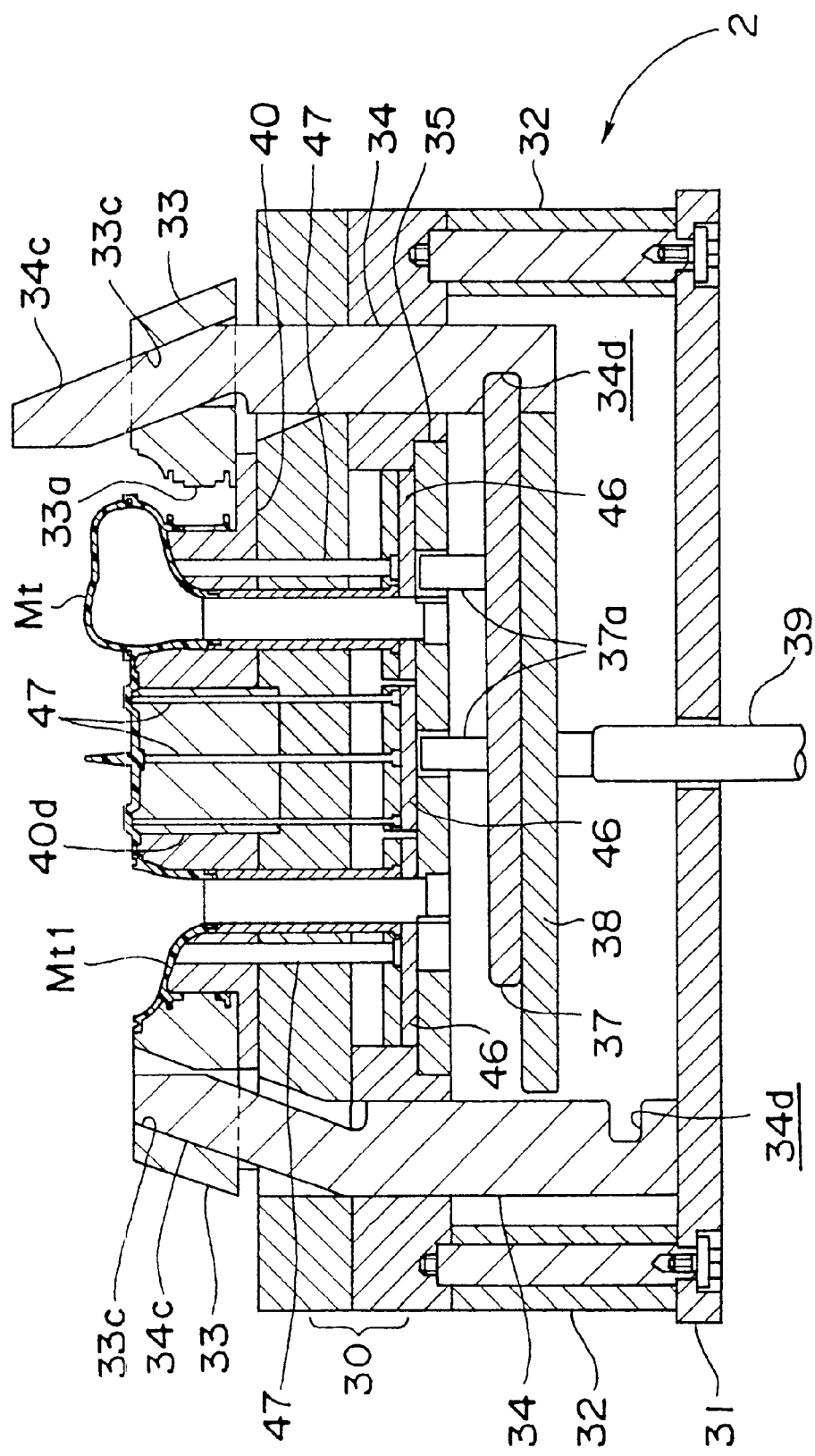
FIG. 11 is an explanatory view in vertical section similar to FIG. 9 which shows a slide die of the mold in driven condition.

Subsequently, as FIG. 11 shows, the slide guide 34 is driven to move (advance) toward the body portion 30 of the movable die 2. As a consequence of this advance, the slide die 33 is caused to slide outwardly in such a way that a tapered bore 33c of the slide die 33 goes along a tapered portion 34c of the slide guide 34, and the core portion 33a of the slide die 33 is pulled out from the opening of port flange Mf. That is, the core portion 33a of the slide die 33 which slidable in a direction different from (nearly orthogonal to) the open/close direction of the movable die 2 is pulled out from the opening of the port flange Mf of molded item Mt.

In this way, by joining upper and lower halves Mt1 and Mt2 first with secondary resin mass, it is possible to obtain more stably higher joint strength of jointed halves and higher sealing performance of a abutted portion as compared with the prior art practice in which adhesive bonding or heat melting is carried out for joining the halves, and by using the DRI method it is possible to achieve higher production efficiency.

Figure 12:
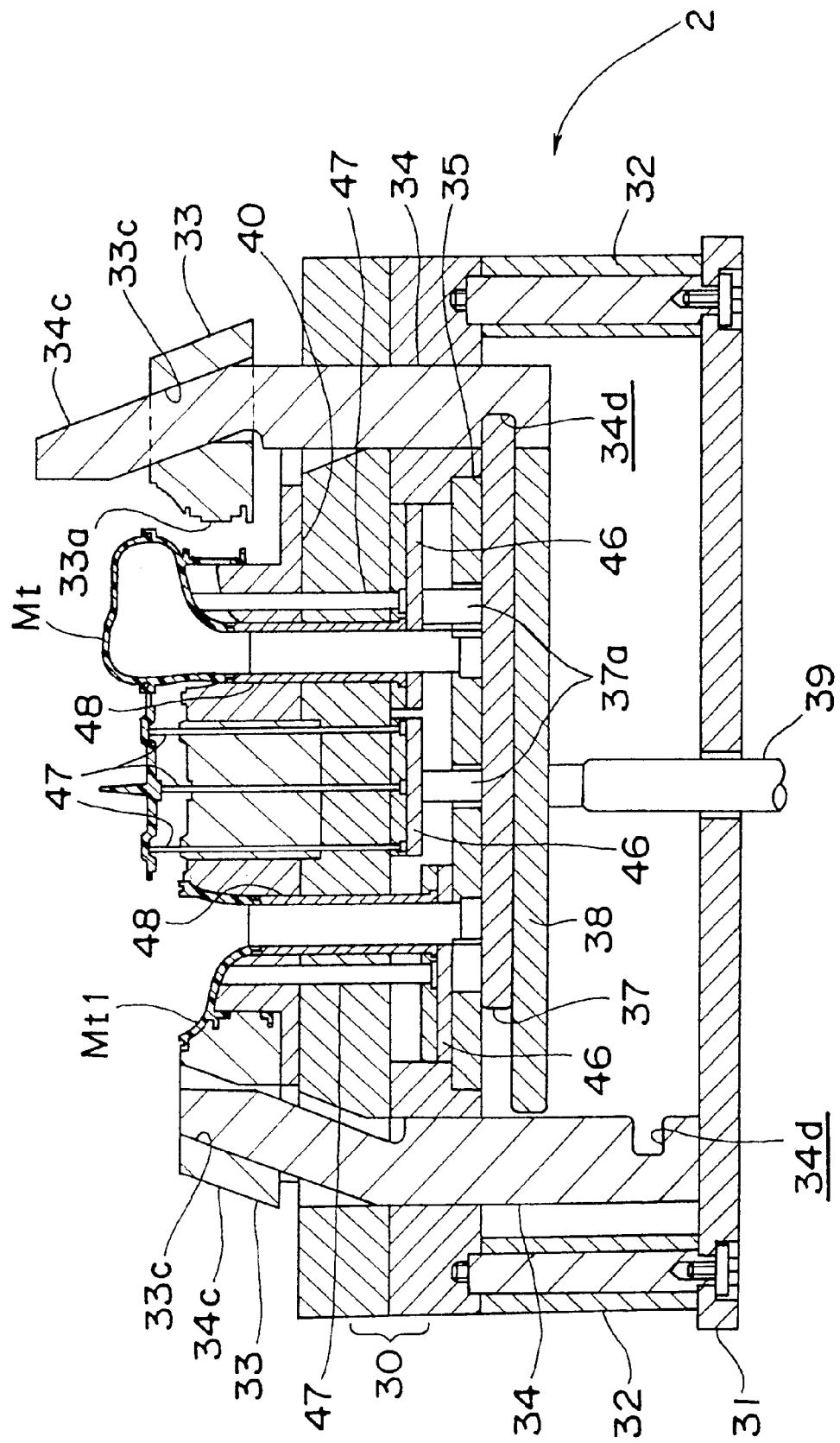
FIG. 12 is an explanatory view in vertical section similar to FIG. 9 which shows an ejector mechanism of the mold in driven condition.

As the slide guide 34 is further advanced, as FIG. 12 shows, two projecting pins 37a of the guide drive plates 37 extend through two of the three holes of a body support plate 35 (two on the right side in FIG. 12) respectively to push up two ejector plates 46, whereby corresponding ejector pins 47 and ejector rings 48 are actuated.

On the stationary die 1 side there are provided two hydraulically driven ejector pins 27 (see FIGS. 9, 10, and 13), and in a series of operation examples shown in FIGS. 9 to 12, at the time of die opening (see FIG. 10) after completion of molding operation, the. ejector pins 27 are pushed forward.

Figure 15:
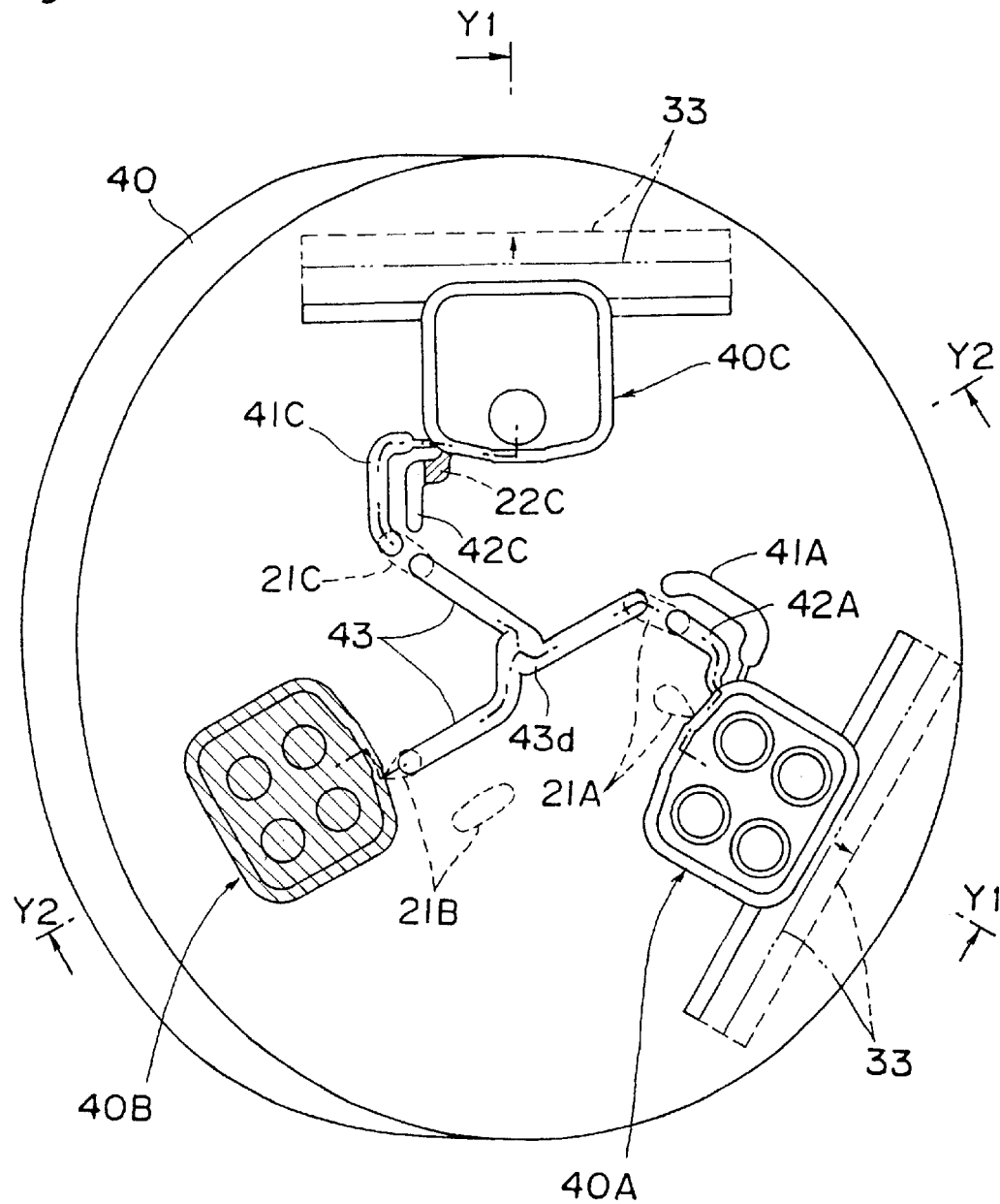
FIG. 15 is an explanatory view in front elevation showing a die matching surface of the rotor of the movable die.
Figure 16:
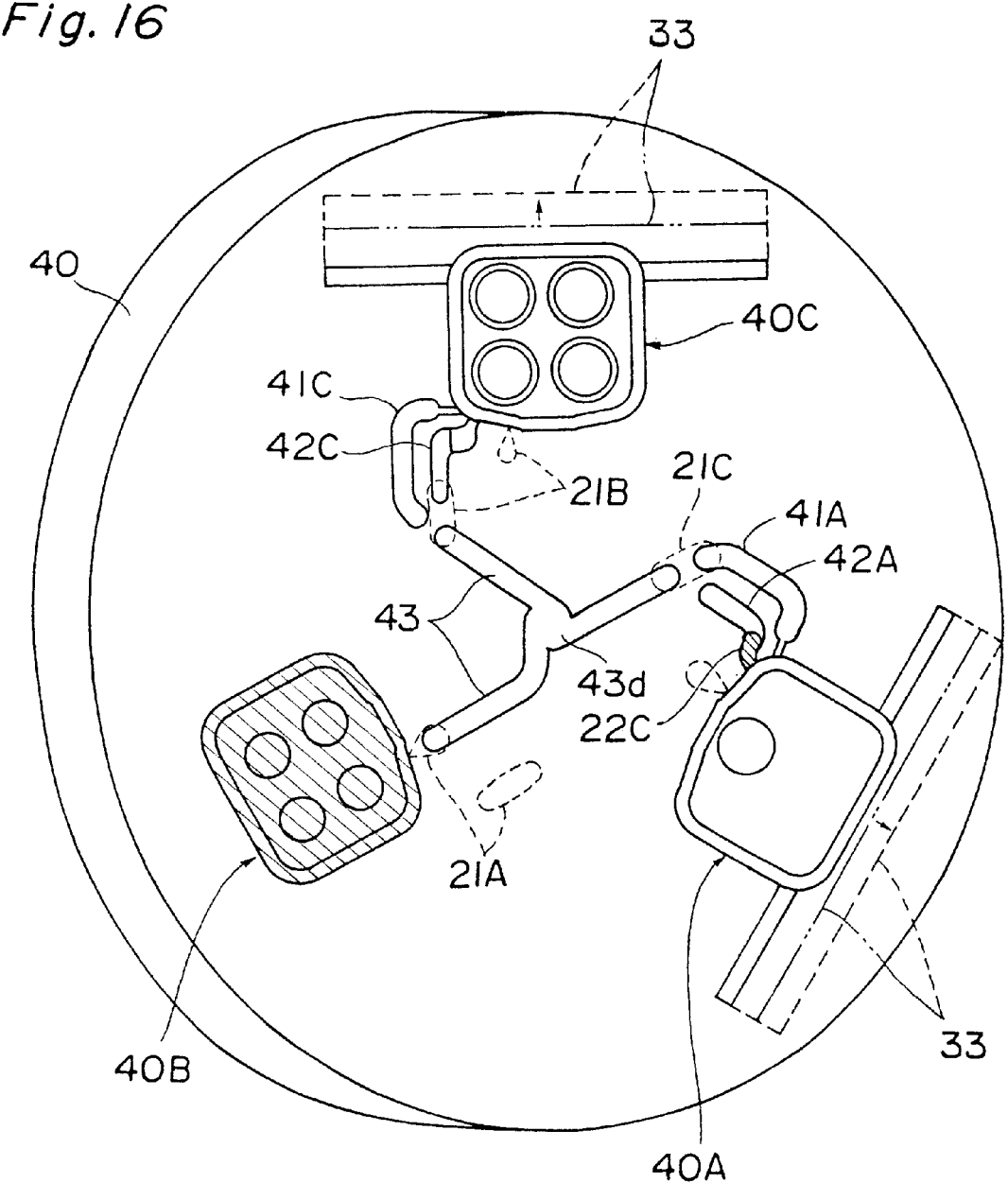
FIG. 16 is an explanatory view in front elevation for explaining the die spotting surface of the rotor in switched condition for resin passage changeover.
Figure 17:
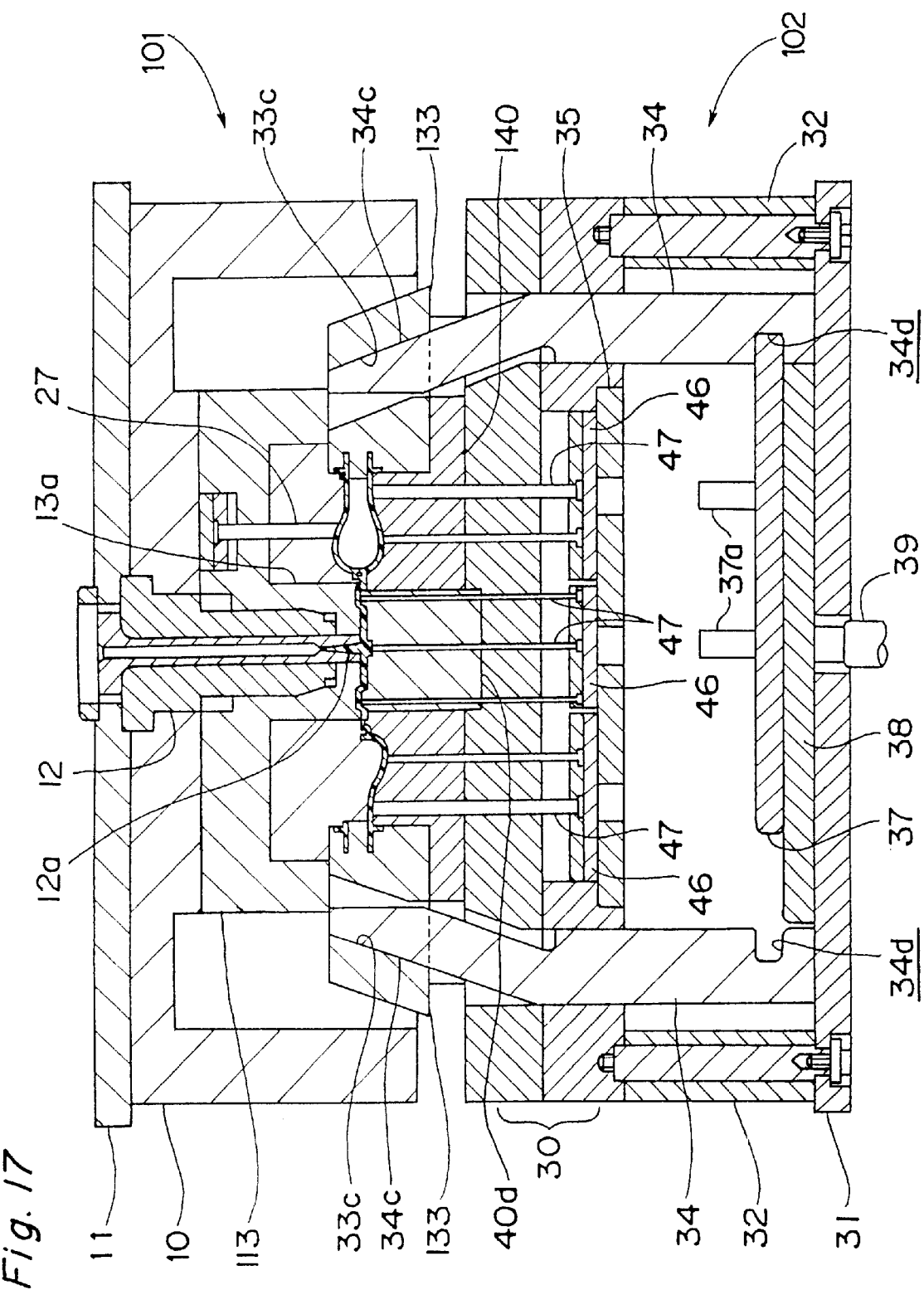
FIG. 17 is an explanatory view in a vertical section taken along line Y3—Y3 in FIG. 23, showing a mold, in clamped condition, for molding the outlet pipe of the intake manifold.

FIG. 14 is an explanatory view showing the rotor 13 of stationary die 1 (on the right side in FIG. 14) and the die plate 40 of movable die 2 (on the left side in FIG. 14) in opened condition. FIGS. 15 and 16 are explanatory views in front elevation showing the die plate 40 of the movable die 2 on the die matching surface side.

As these drawings show, the rotor 13 is provided with three molding portions 20A, 20B and 20C arranged at angularly equally spaced intervals (i.e., at angular intervals of 120 degrees). The molding portion 20C is a male molding portion formed in a convex pattern, and the molding portions 20A and 20B are both female molding portions formed in a concave pattern. That is, rotor 13 of the stationary die 1 has one male molding portion 20C and two female molding portions 20A, 20B. These molding portions are arranged at the intervals of 120 degree in the order of male/female/female in the direction of rotation of the rotor 13.

It is to be noted that, in FIGS. 14 to 16, the male molding portion formed in a convex pattern is shown by oblique hatched line.

There are no resin passages for connection to molding portions 20A, 20B, 20C provided on the rotor 13 of the stationary die 1.

However, in the present embodiment, as will be described hereinafter, on the surface of a central projection 13a of the rotor 13 there are provided a group of changeover slots 21 (21A, 21B, 21C; 5 slots in all in the present embodiment), mainly of groove shape, for switching over the connection between sprue 12a of sprue bushing 12 and resin passages associated with the molding portion of the movable die 2 side. The changeover slots 21 are respectively arranged adjacent corresponding molding portions or in communication with said molding portions. The male molding portion 20C is provided with a projection 22C.

Not specifically shown in FIG. 14, though, as above described (see FIG. 13), on the outer periphery of the rotor 13, there is provided a toothed portion 13g adopted to go into mesh engagement with drive gear 14 at least for the length of an arc corresponding to the angle of 120 degrees so that as the drive gear 14 rotates (that is, according to the direction of rotation and the number of turns), the rotor 13 rotates an angle of 120 degrees in the predetermined direction. Control of rotation of the drive gear 14 (that is, rotation control of the rotor 13) is carried out by controlling the drive power source 15, such as hydraulic motor (see FIG. 13).

In the present embodiment, the rotor 13 is arranged to be rotated forward and reverse direction alternately for 120 degrees at predetermined time intervals. In the FIG. 14 condition, for example, when the drive gear 14 rotates, the rotor 13 turns counterclockwise in FIG. 14 (see solid line arrow in FIG. 14).

Whilst, FIGS. 15 and 16 are explanatory views in front elevation showing the die plate 40 of the movable die 2 at its die matching surface side. As shown in the drawings, the die plate 40 has three molding portions 40A, 40B, 40C formed thereon at circumferentially equally spaced relation (that is, at an angle of of 120° to each other). Molding portion 40B is a male molding portion formed in a convex pattern, and molding portions 40A and 40C are both female molding portions formed in a concave pattern. That is, the movable die 2 includes one male molding portion 40B and two female molding portions 40A, 40C, which are arranged in the order of male/female/female at angular intervals of 120° along the circumference of the die plate 40.

FIGS. 9 to 12 are explanatory views in vertical section taken along line Y1—Y1 in FIG. 15, and FIG. 13 is an explanatory view in vertical section taken along line Y2—Y2 in FIG. 15.

In the present embodiment, on the die plate 40 of the movable die 2 there are provided two kinds of resin passages, that is, primary and secondary resin passages 41 (41A, 41B, 41C), 42 (42A, 42C) connected directly to molding portions 40A, 40B, 40C, and branched resin passage 43 formed in a branched fashion in a central cylinder portion 40d of the die plate 40.

Connected to the female molding portions 40A, 40C are primary resin passages 41A, 41C for supplying primary resin for molding halves (Mt1, Mt2), and secondary resin passages 42A, 42C for supplying secondary resin for joining abutted upper and lower halves Mt1, Mt2. Whilst, the front end portion of one of the branched resin passages 43 is positioned adjacent the male molding portion 40B at a specified distance therefrom.

The branched resin passages 43 are branched as such from a center portion 43d corresponding to sprue 12a of sprue bushing 12 when movable die 2 is closed in relation to stationary die 1, so that three branched portions are provided in corresponding relation to primary and secondary resin passages 41 (41A, 41C), 42 (42A, 42C), or molding portion 40B. Each of the branched portions is so positioned that its front end, on an extension thereof, is spaced a predetermined distance from or adjacent one end of the corresponding resin passage.

When the movable die 2 is closed in relation to the stationary die 1, a specified resin passage is connected, by a changeover slot 21 provided on the rotor 13 of the stationary die 1, to a branched resin passage 43 (that is, to sprue 12a). This connection can be switched over by the rotation of the rotor 13.

The process of molding a surge tank Mt to be carried out by using a molding die assembly constructed as above described will now be described.

First, in its initial condition, where the stationary die 1 is put in combination with the movable die 2 in such a condition as illustrated in FIG. 14, combination of molding portions of the two dies 1, 2 are as follows:
movable die 2, molding portion 40A (female)/stationary die 1, molding portion 20A (female)
movable die 2, molding portion 40B (male)/stationary die 1, molding portion 20B (female)
movable die 2, molding portion 40C (female)/stationary die 1, molding portion 20C (male)

In this case, changeover slot 21 of the rotor 13 of the stationary die 1 is at a position shown by broken lines in FIG. 15. That is, one of the changeover slots 21A allows secondary resin passage 42A for molding portion 40A of movable die 2 to communicate with branched resin passage 43, while changeover slot 21C allows primary resin passage 41C for molding portion 40C of movable die 2 communicate with branched resin passage 43.

Branched resin passage 43 opposed to molding portion 40B of movable die 2 is connected to molding portion 40B by one of the changeover slots 21B.

In this condition, therefore, movable die 2 is closed in relation to stationary die 1 (see FIGS. 1 and 5), and die clamping is carried out, then melted resin is injected from a molder (not shown), the melted resin is supplied through sprue 12a to resin passages 42A, 41C, and 21B which are in communication with branched resin passages 43. It is to be noted that, in the present embodiment, by way of example, a polyamide resin blended with glass fiber reinforcement material was used as material resin.

As a result, in molding cavities formed by combinations of molding portions of stationary die 1 and movable die 2 the following molded products are obtained:

molding portion 40A (female)/molding portion 20A (female): surge tank, finished product Mt;

molding portion 40B (male)/molding portion 20B (female): lower half Mt2;

molding portion 40C (female)/molding portion 20C (male): upper half Mt1.

It is to be noted in this connection that in the case of initial injecting operation, in a molding cavity defined by molding portion 40A (female die)/molding portion 20A (female die) there are present none of molded halves (upper half Mt1 and lower half Mt2); and therefore, melted resin injection is carried out after dummies having same outer configuration as abutted upper and lower halves Mt1 and Mt2 are set in the cavity.

The guide drive plate 37 is always so arranged that it constantly engages a recess 34d of the slide guide 34 (right side-slide guide 34 in the example shown in FIGS. 9 to 12) which is engageable with the slide die 33 for a finished surge tank Mt. In this case, secondary resin passage 42A connected to the molding portion 40A is closed without fail by a projection 22C annexed to the male molding portion 20C of the rotor 13.

Figure 10:
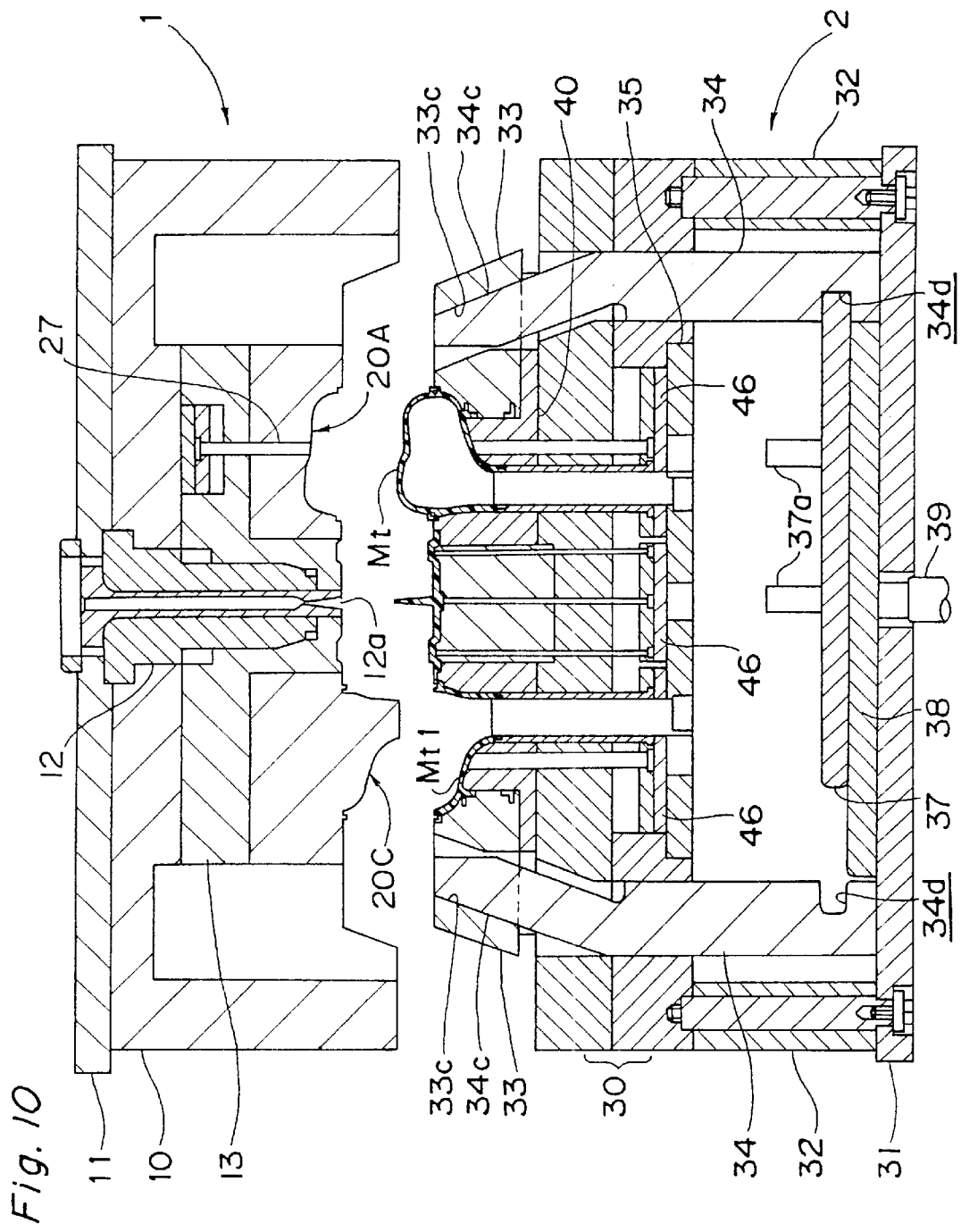
FIG. 10 is an explanatory view in vertical section similar to FIG. 9 which shows the mold in opened condition.

Upon completion of the injecting operation, the movable die 2 is retracted from the stationary die 1 for die opening (see FIG. 10). At this point of time, ejector pin 27a on the stationary die 1 side is pushed forward so that there is no possibility of the finished surge tank Mt remaining on the stationary die 1 side.

Next, the piston rod 39 is advanced to move forward the slide guide 34 engageable with the slide die 33 for finished surge tank Mt which (see FIG. 11), so that a core portion 33a of the slide die 33 for finished surge tank Mt is withdrawn from openings Ha1–Hd1 of port flange Mf of finished product Mt.

In this way, core portion 33a of the slide die 33 which slides in a direction different from (orthogonal to) the open/close direction of molding die (movable die 2) can be released from finished product Mt.

Thus slide guide 34 is further advanced so that projecting pins 37a of guide drive plate 37 push up corresponding ejector plates 46 to actuate (for push up operation) ejector pins 47 and ejector rings 48.

Through this operation, core member 36 is removed from the end of inlet pipe Mi of the finished surge tank Mt and, at the same time, the finished product Mt is released from the movable die 2 for removal out of the die (see FIG. 12).

In FIGS. 14 to 16, at locations outside female molding portions 40A, 40C, advance position (chain double-dashed line) and retreat position (broken line) of slide die 33 are schematically shown.

Whilst, the lower half Mt2 molded in a cavity defined by molding portion 40B (male) and molding portion 20B (female) remains as it is in the molding portion 20B of the stationary die 1, and the upper half Mt1 molded in a cavity defined by molding portion 40C (female)/molding portion 20C (male) remains as it is in the molding portion 40C of the movable die 2.

The rotor 13 of the stationary die 1 is caused to rotate 120 degrees in a direction shown by a solid line arrow in FIG. 14, and thereafter the movable die 2 is caused to advance for closure with the stationary die 1. Then, die clamping is carried out.

In this connection, the guide drive plate 37 is caused to slide along a pair of guide rails 38a (see FIG. 13) provided on a back plate 38, being thus released from engagement with the slide guide 34 on the right side in FIGS. 9 to 12 and, in turn, the guide drive plate goes to engagement with a recess 34d of the slide guide 34 on the left side in the figures.

Where the stationary die 1 in such rotational condition is put in combination with the movable die 2, combinations of the molding portions of the dies 1 and 2 are as follows:

movable die 2, molding portion 40A (female)/stationary die 1, molding portion 20C (male)

movable die 2, molding portion 40B (male)/stationary die 1, molding portion 20A (female)

movable die 2, molding portion 40C (female)/stationary die 1, molding portion 20B (female)

In this case, as already mentioned, lower half Mt2 and upper half Mt1 are respectively left in the molding portion 20B of the stationary die 1 and in the molding portion 40C of the movable die 2; therefore, by rotating the rotor 13, the upper half Mt1 and lower half Mt2 are brought into abutment with each other in a cavity defined by molding portion 40C (female) and molding portion 20B (female).

In this case, changeover slot 21 of the rotor 13 of the stationary die 1 is at a rotational position shown by broken lines in FIG. 16. That is, changeover slot 21C allows primary resin passage 41A for molding portion 40A of movable die 2 to communicate with branched resin passage 43, while one of changeover slots 21B allows secondary resin passage 42C for molding portion 40C of movable die 2 to communicate with branched resin passage 43. The branched resin passage 43 opposed to molding portion 40B of the movable die 2 is connected to molding portion 40B by one of changeover slots 21A.

At the position of rotation in FIG. 16, on the side of the molding portion 40C at which secondary resin passage 42C is in communication with branched resin passage 43, each core portions 33a of slide die 33 is pushed out and inserted into the openings of port flange of the molding portion 40C.

In this condition, the movable die 2 is brought into abutment with the stationary die 1 (see FIGS. 9 and 13), and die clamping is carried out; then melted resin is injected from a molder (not shown), whereupon the melted resin is supplied through sprues 12a to resin passages 41A, 42C, 41B which are in communication with branched resin passages 43.

In this case, a secondary resin passage 42A connected to the molding portion 40A is closed without fail by a projection 22C annexed to a male molding portion 20C of the rotor 13.

As a result, in molding cavities defined by an assembly of combinations of molding portions of stationary die 1 and movable die 2, the following molded items are produced:

molding portion 40A (female)/molding portion 20C (male): upper half Mt1;

molding portion 40B (male)/molding portion 20A (female): lower half Mt2;

molding portion 40C (female)/molding portion 20B (female): finished product Mt.

It is to be noted that in the molding portion 40B (male) of the movable die 2, lower half Mt2 is constantly molded irrespective of the state of rotation of the rotor 13.

After this operation, die opening is carried out and a finished surge tank Mt is removed. In this state of rotor operation, slide guide 34 at the left side in FIGS. 9 to 12 is driven, and with respect to ejector plates 46, left side two ejector plates are driven.

In this case, lower half Mt2 remains as it is in the molding portion 20A of the stationary die 1, and upper half Mt1 remains as it is in the molding portion 40A of the movable die 2.

In this condition, rotor 13 is caused to rotate 120 degrees in reverse direction (see broken line arrow in FIG. 14) and die clamping is carried out, whereupon operation returns to its initial condition (see FIG. 14). By repeating similar steps, it is possible to obtain one finished product Mt.

In other words, each time when the process of forward and reverse rotation of 120 degrees is repeated, die clamping, injection, and die opening are carried out. Thus, for each cycle of such rotational operation of the rotor 13, it is possible to obtain one finished molded surge tank Mt.

Next, construction and operation of DRI molding die assembly for use in the fabrication (molding) of outlet pipes Mb, Mc will be described.

Outlet pipes Mb, Mc are laterally symmetrical bends and their longitudinal axes, at respective both ends thereof, form a specified angle $\alpha$ of about 180° or more (in the present embodiment $\alpha$=about 270°; see FIG. 4) with respect to the bending direction of the outlet pipe as viewed in side elevation. In the case of the outlet pipes Mb, Mc, they are bent approximately within one plane.

FIGS. 17 to 21 are explanatory views in vertical section of a molding die assembly for molding outlet pipes Mb, Mc. The molding die assembly is similar in vertical sectional configuration to the molding die for molding the surge tank, except the configuration of each molding portion, and is also similar in the manner of operation.

Therefore, for items similar in constitution and function to those shown in FIGS. 9 to 13 with respect to the surge tank, in order to avoid duplication of explanation, like reference numerals are given and any further description is omitted; so description is given basically only with respect to those points which are different from those described with respect to the molding die assembly for the surge tank. It is to be noted that FIGS. 17 to 21 correspond to FIGS. 9 to 13 respectively.

In the case of molding process for outlet pipes Mb, Mc, as will be described hereinafter, two pipes Mb, Mc are molded in one set. That is, one set (2 pipes) of outlet pipes Mb, Mc is molded for each rotational movement of rotor 113 of stationary die 101.

In the case of molding die assembly for molding surge tanks, a core portion 33a of slide die 33 is inserted into and removed from openings Ha1–Hd1 of port flange MF, but in the case of molding outlet pipes Mb, Mc, as shown in FIGS. 17 to 20, a core portion 133a of a slide die 133 is inserted into and removed from a pipe end opening (outlet pipe to be connected to port flange Mf at the pipe end) of one of outlet pipes Mb, Mc. It is to be noted that in the case of molding die for molding of outlet pipes, as will be hereinafter described, in complementary relation to the other pipe end opening (the pipe end to be connected to surge tank Mt) of outlet pipes Mb, Mc which is bent in C shape as viewed in front elevation, there is provided, separately from the slide die 133 (first slide die), a second slide die 133' which is back and forth movable in directions different 90 degrees from the direction of movement of the first slide die.

In the molding die assembly for surge tanks, there is provided a core member 36 corresponding to an end portion of inlet pipe Mi, on the other hand, in the case of molding die assembly for outlet pipes, there is provided no core member since it is not required.

Such as sectional configuration and open/close operation of molding die shown in FIGS. 17 to 21 are basically same as those shown in FIGS. 9 to 13 with respect to the molding die for surge tanks, therefore, further description is omitted.

Figure 22:
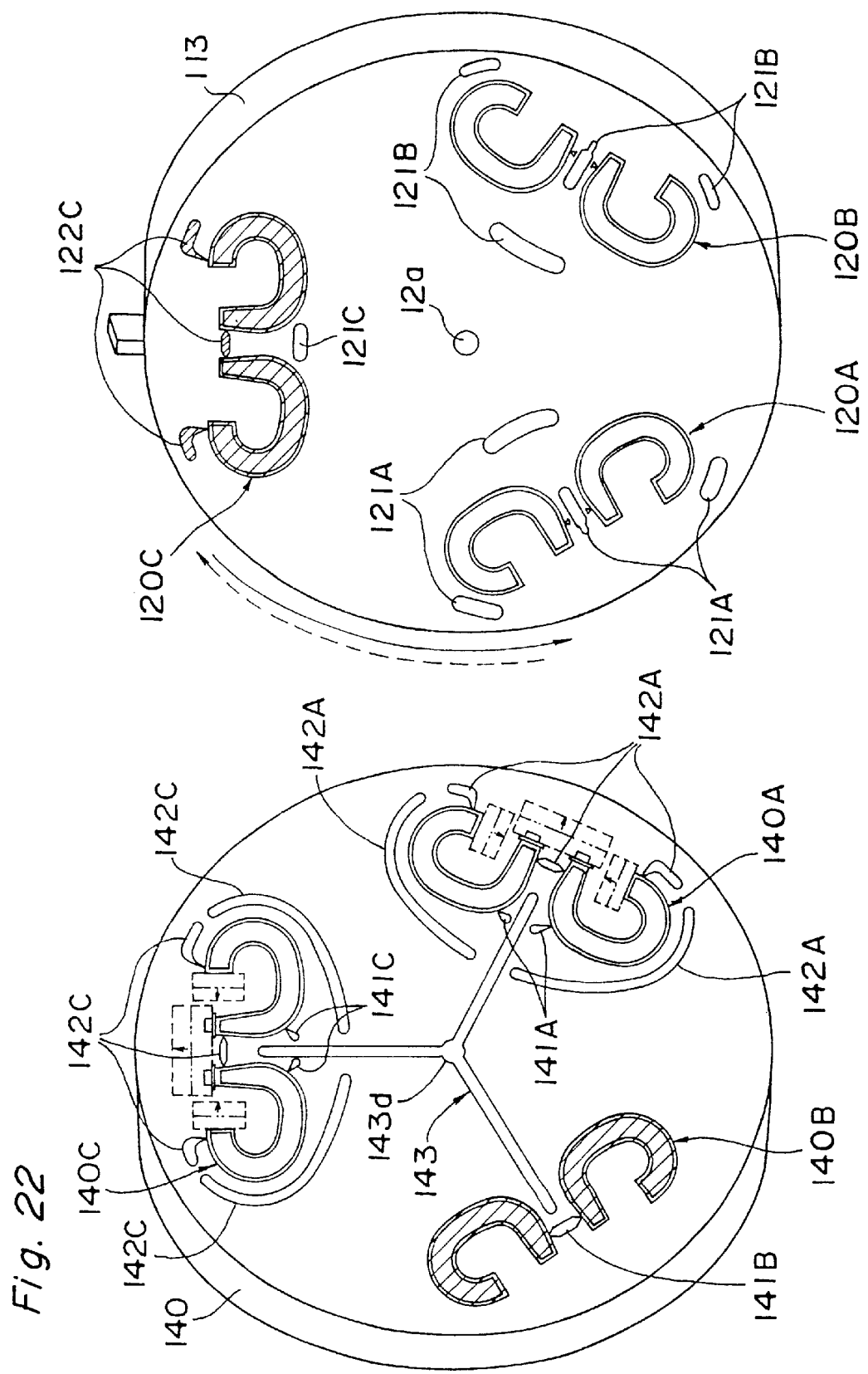
FIG. 22 is an explanatory view of the mold for molding the outlet pipe in front elevation showing a stationary rotor and a movable die plate in opened condition.
Figure 23:
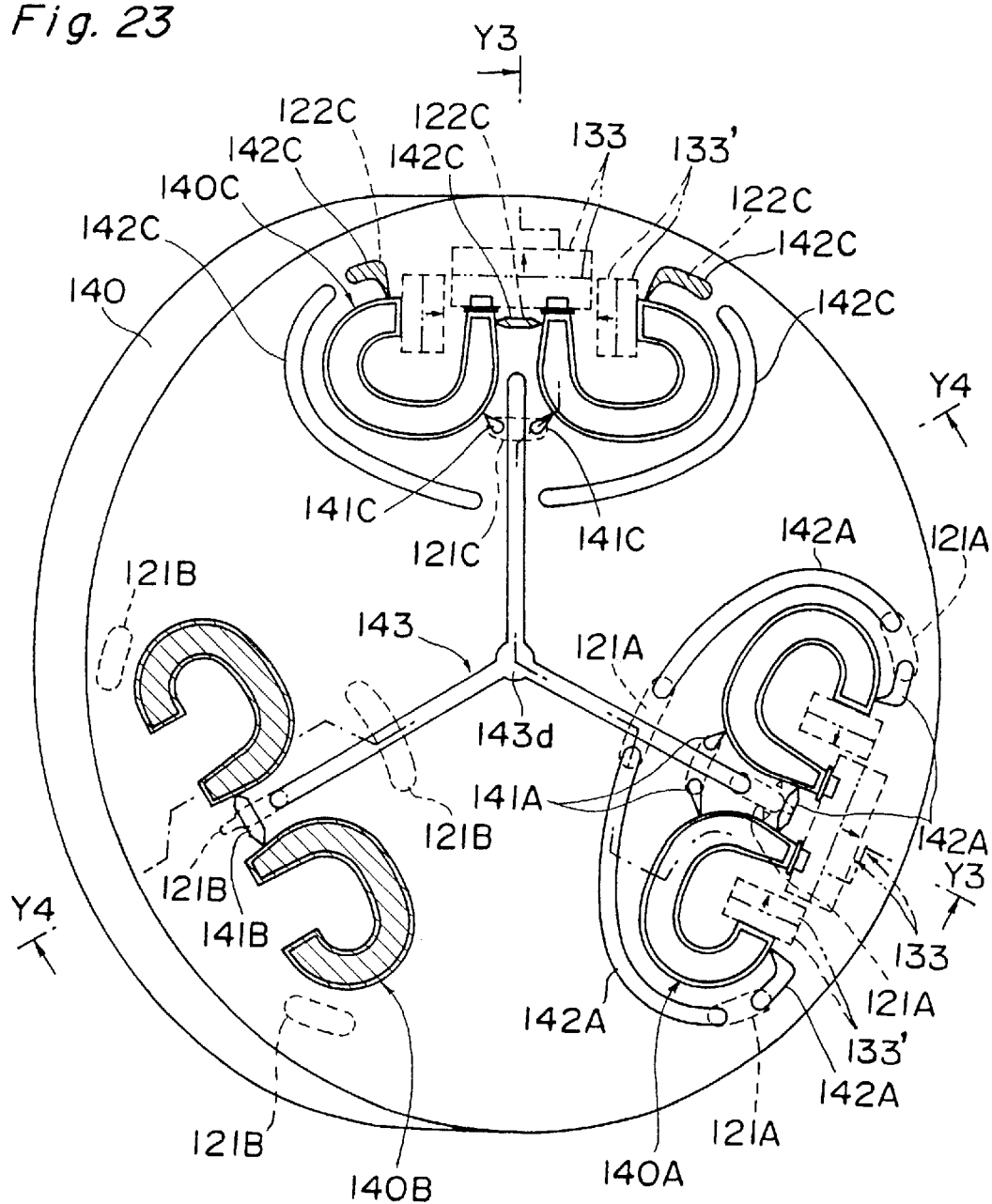
FIG. 23 is an explanatory view in front elevation showing a die matching surface of the rotor of the movable die in FIG. 22.
Figure 24:
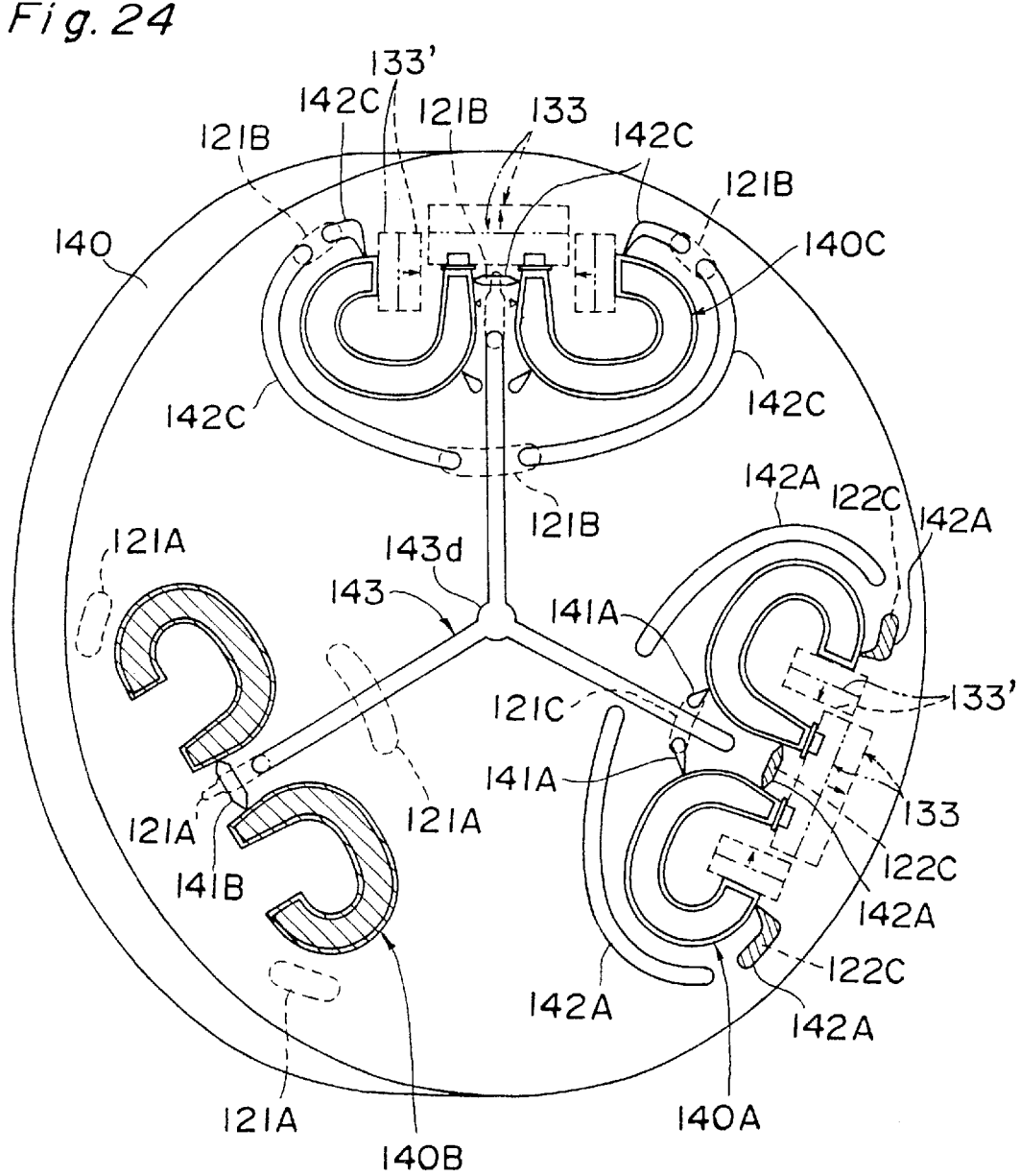
FIG. 24 is an explanatory view in front elevation for explaining the die spotting surface of the rotor in switched condition for resin passage changeover in FIG. 22.

FIG. 22 is an explanatory view showing a rotor 113 of stationary die 101 (at right side in FIG. 22) and a die plate 140 of movable die 102 (at left side in FIG. 22) in die opening condition. FIGS. 23 and 24 are explanatory views in front elevation showing die matching surface side of die plate 140 of the movable die 102.

As shown in these figures, rotor 113 includes three molding portions 120A, 120B, and 120C which are arranged circumferentially equally angled relation (that is, at an angle of 120° each). The molding portion 120C is a male molding portion formed in a convex shape, and molding portions 120A, 120B are both female molding portions formed in a concave shape. That is, the rotor 113 of the stationary die 101 includes one male molding portion 120C and two female molding portions 120A, 120B, and they are arranged in the order of male/female/female at angular intervals of 120° in the direction of rotation of the rotor 113.

It is to be noted that, in FIGS. 22 to 24, the male molding portion formed in a convex shape is shown in oblique hatching. FIGS. 22 to 24 correspond to FIGS. 14 to 16 with respect to the molding die for surge tanks.

On the surface of a center projection of the rotor 113, as in the case of molding die for surge tank, there is provided a group of changeover slots 121 (121A, 121B, 121C) mainly of groove shape, for switching the connection between a resin passage connected to a molding portion of movable die 102 and a sprue 12a of sprue bushing 12. The changeover slots 121 are respectively provided adjacent or in communication with corresponding molding portions. A projection 122C is provided in a male molding portion 120C.

As may be appreciated from the drawings, each molding portion is constituted so that upper and lower halves or a finished item of two pipes Mb, Mc arranged in laterally (right and left) symmetrical relation as a set can be molded.

Drive mechanism and rotation control of the rotor 113 are same as in the case of molding die assembly for surge tank.

Whilst, FIGS. 23 and 24 are explanatory views in front elevation showing the configuration of matching surface side of a die plate 140 of the movable die 102. As shown in the drawings, the die plate 140 includes three molding portions 140A, 140B, and 140C arranged is circumferentially equally angled relation (that is, at an angle of 120° each).

The molding portion 140B is a male molding portion formed in a convex shape, and molding portions 140A, 140C are both female molding portions formed in a concave shape. That is, the movable die 102 includes one male molding portion 140B and two female molding portions 140A, 140C, and they are arranged in the order of male/female/female at angular intervals of 120° in the circumferential direction of the die plate 140.

Figure 20:
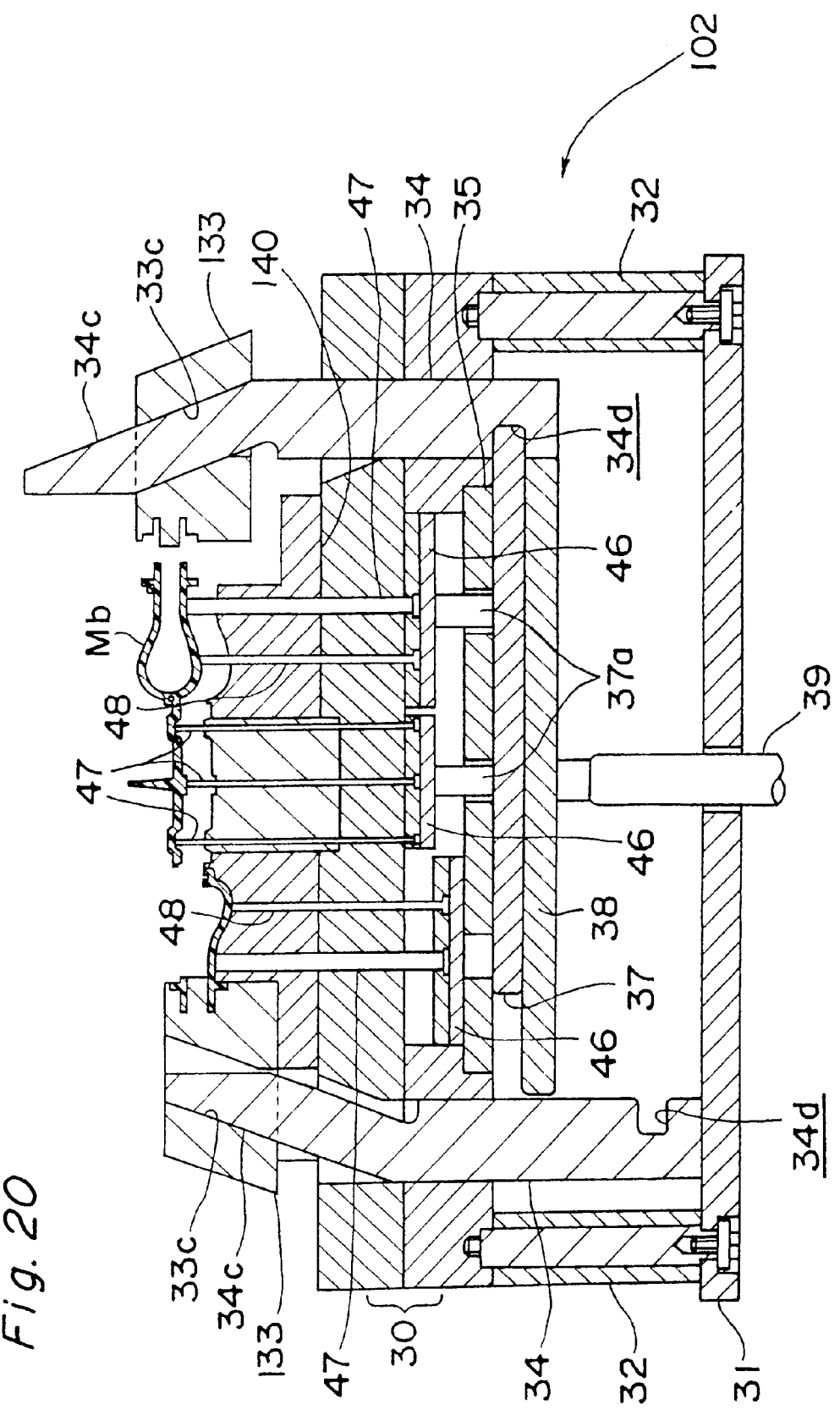
FIG. 20 is an explanatory view of a vertical section similar to FIG. 17 which shows an ejector mechanism, in driven condition, of the mold for molding the outlet pipe.
Figure 21:
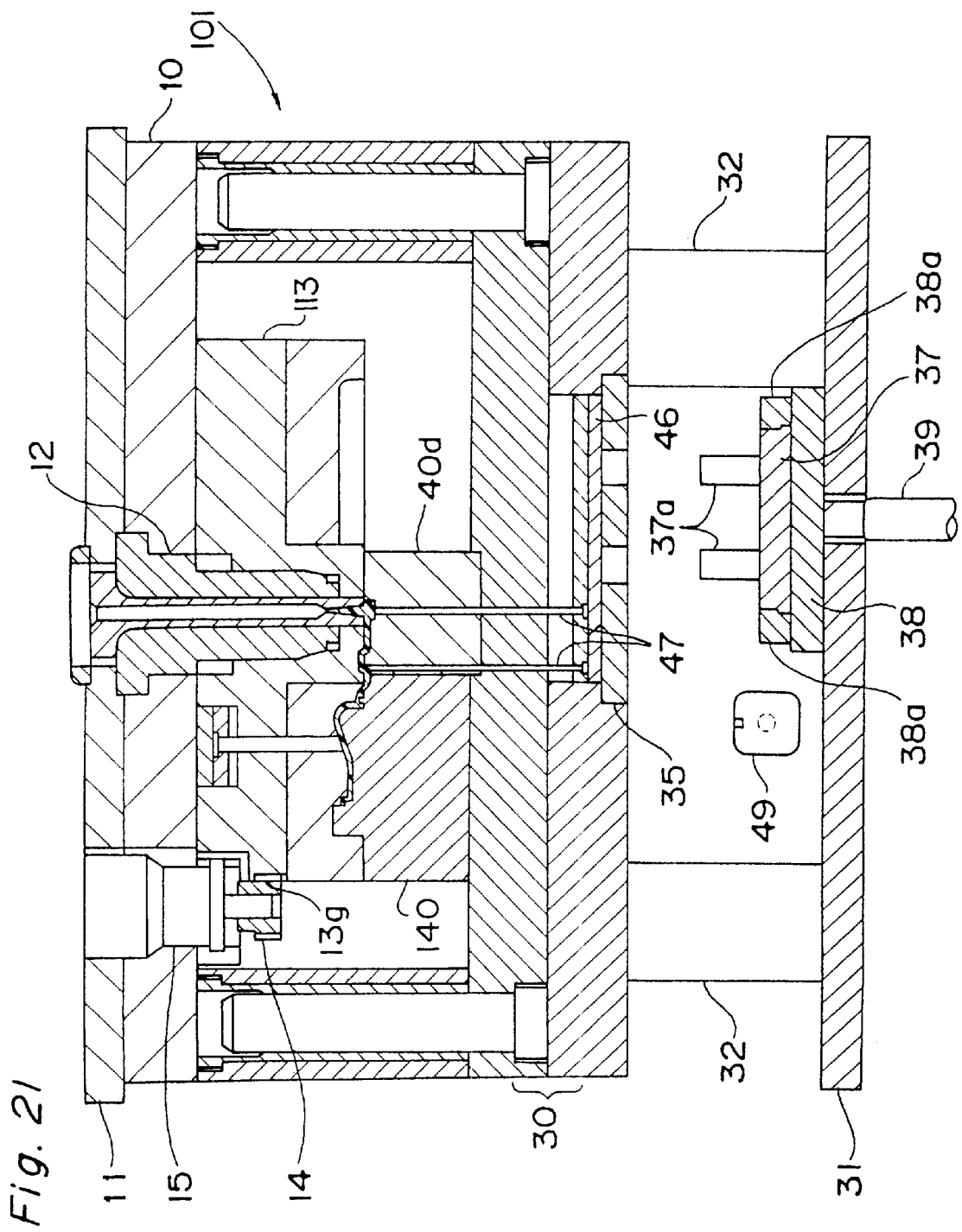
FIG. 21 is an explanatory view of a vertical section taken along line Y4—Y4 in FIG. 23, showing the mold, in clamped condition, for molding the outlet pipe.

It is to be noted that FIGS. 17 to 20 are explanatory views in vertical section taken along line Y3—Y3 in FIG. 23, and FIG. 21 is an explanatory view in vertical section taken along line Y4—Y4 in FIG. 23.

On the die plate 140 of movable die 102, there are provided two kinds of resin passages, that is, primary and secondary resin passages 141 (141A, 141B, 141C) and 142 (142A, 142C) which are connected directly to molding portions 140A, 140B, 140C, and branched resin passages 143 formed in branched fashion in a central cylinder portion 140d of the die plate 140.

Primary resin passages 141A, 141C which supply primary resin for molding halves are connected to molding portions 140A, 140C, and secondary resin passages 142A, 142C which supply secondary resin for joining abutted upper and lower halves are provided adjacent thereto. Whilst, primary resin passage 141B only is connected to male molding portion 140B.

The branched resin passage 143 is branched from a center portion 143d corresponding to sprue 12a of sprue bushing 12 when movable die 102 is closed in relation to stationary die 101, so that three branched portions are provided in corresponding relation to primary and secondary resin passages 141 (141A, 141B, 141C) and 142 (142A, 142C) which are connected to female die molding portions 40A, 40C.

Each branched portion, at its front end, is positioned at a predetermined distance from a location adjacent one end of the corresponding resin passage.

When movable die 102 is closed in relation to the stationary die 101, a specified resin passage is connected by a changeover slot 121 provided on the rotor 113 of the stationary die 101 to branched resin passage 143 (that is, sprue 12a). This connection can be changed by the rotation of the rotor 113.

The process of molding outlet pipes Mb, Mc to be carried out by using a molding die assembly constructed as above described will now be described.

First, in its initial condition, the arrangement of the molding die is such that stationary die 101 and movable die 102 are held in combination as shown in FIG. 22, in which case the combinations of molding portions of these two dies 101, 102 are as follows:

movable die, molding portion 140A (female)/stationary die, molding portion 120A (female)

movable die, molding portion 140B (male)/stationary die, molding portion 120B (female)

movable die, molding portion 140C (female)/stationary die, molding portion 120C (male)

In this case, changeover slot 121 of the rotor 113 of the stationary die 101 is at a position shown by broken line in FIG. 23. That is, changeover slot 121A allows secondary resin passage 142A for molding portion 140A of movable die 102 to communicate with branched resin passage 143, while changeover slot 121C allows primary resin passage 141C for molding portion 140C of movable die 102 to communicate with branched resin passage 143.

Further, branched resin passage 143 opposed to molding portion 140B of movable die 102 is connected to molding portion 140B by one of the changeover slots 121B.

In this condition, therefore, movable die 102 is closed in relation to stationary die 101 (see FIGS. 17 and 21), and die clamping is carried out, then melted resin is injected from a molder (not shown), the melted resin is supplied through sprue 12a to resin passages 142A, 141C, and 121B which are in communication with branched resin passages 143. It is to be noted that, in the present embodiment, by way of example, a polyamide resin blended with glass fiber reinforcement material was used as material resin.

As a result, in molding cavities formed by combinations of molding portions of stationary die 101 and movable die 102 the following molded products are obtained:

molding portion 140A (female)/molding portion 120A (female): outlet pipe, finished product Mb, Mc:

molding portion 140B (male)/molding portion 120B (female): outlet pipe lower half;

molding portion 140C (female)/molding portion 120C (male): outlet pipe upper half.

It is to be noted in this connection that in the case of initial injecting operation, melted resin injection is carried out after dummies are set in the molding cavity defined by molding portion 40A (female die)/molding portion 20A (female die). In this case, secondary resin passage 142A connected to the molding portion 140A is closed without fail by a projection 122C annexed to the male molding portion 120C of the rotor 113.

Figure 18:
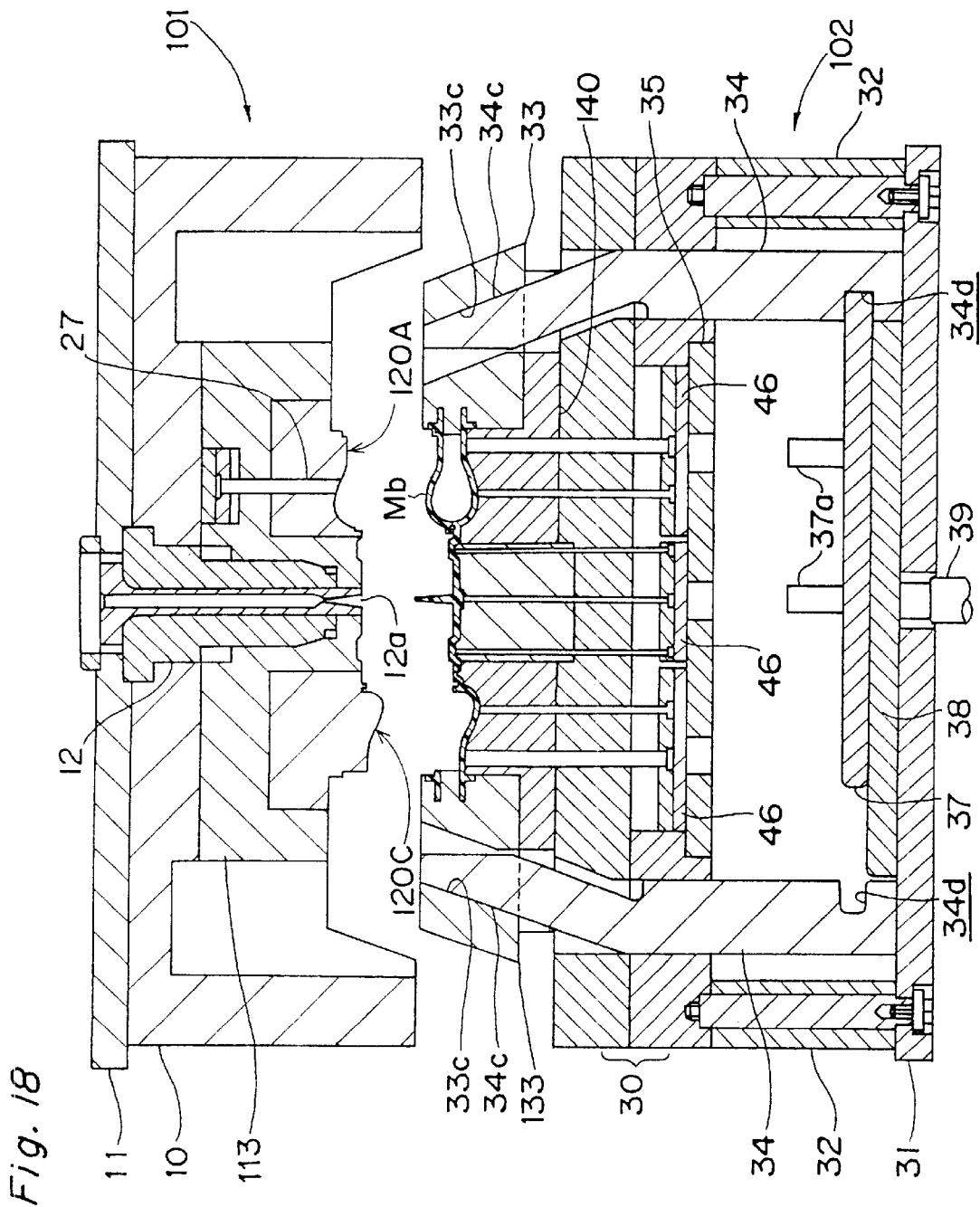
FIG. 18 is an explanatory view of a vertical section similar to FIG. 17 which shows a mold, in opened condition, for molding the outlet pipe.
Figure 19:
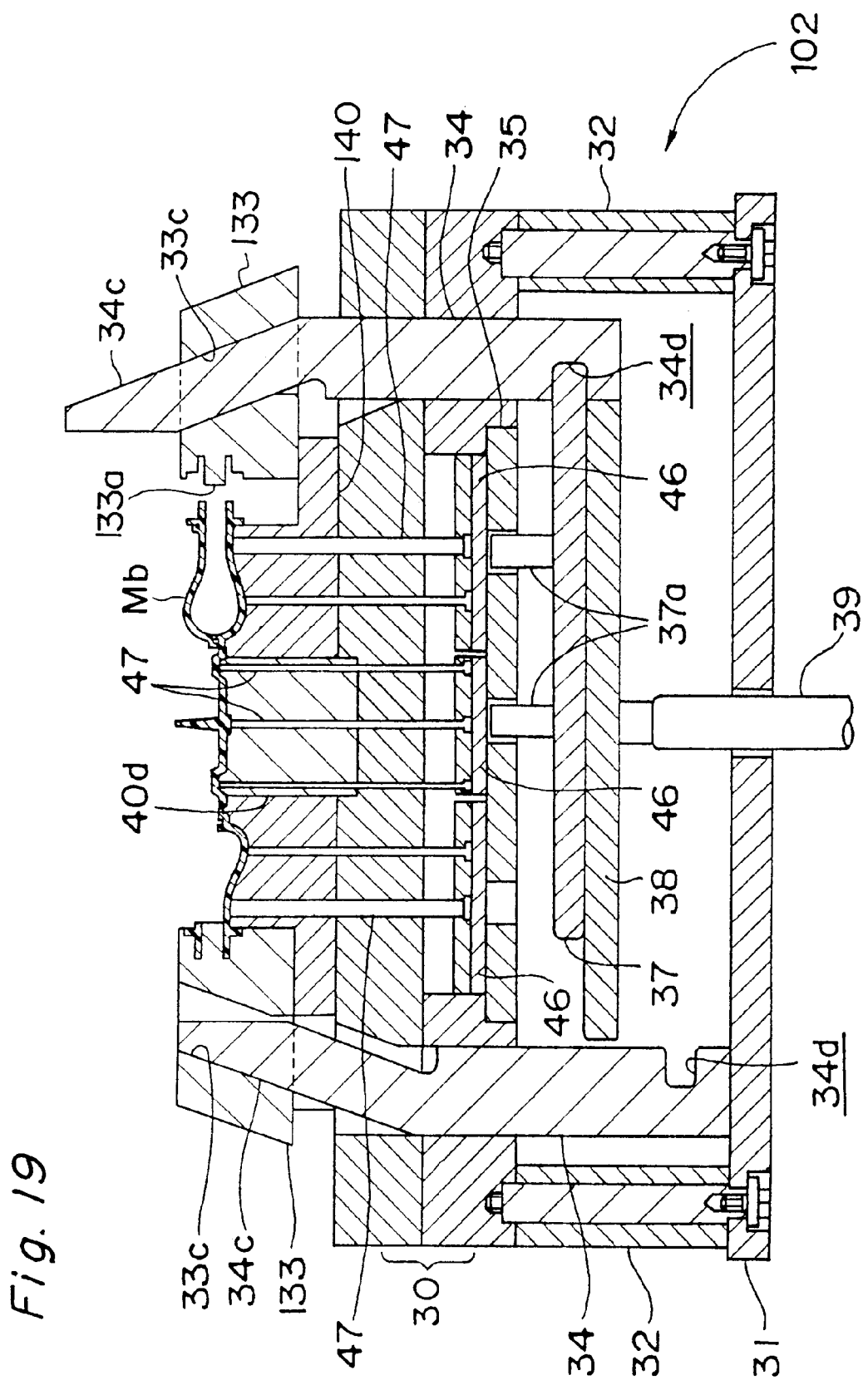
FIG. 19 is an explanatory view of a vertical section similar to FIG. 17 which shows a slide die of the mold, in driven condition, for molding the outlet pipe.

Upon completion of the injecting operation, the movable die 102 is retracted from the stationary die 101 for die opening (see FIG. 18).

Next, the piston rod 39 is advanced to move forward the slide guide 34 (see FIG. 19), so that a core portion 133a of the first slide die 133 for finished products Mb, Mc is withdrawn from openings of pipes.

In FIGS. 22 to 24, schematically shown outside the female molding portions 140A, 140C are advance position (chain double-dashed line) and retreat position (broken line) with respect to first slide die 133 and second slide die 133'. The second slide die 133' is basically similar to the one used in outlet pipes Ma, Md to be described hereinafter (see FIGS. 25 and 26), and includes a cylinder driven core die. The core die of the second slide die 133' is preferably caused to retreat almost simultaneously with the first slide die 133 or retreat with a slight delay.

Thus slide guide 34 is further advanced so that projecting pins 37a of guide drive plate 37 push up corresponding ejector plates 46 to actuate (for push up operation) ejector pins 47, the finished pipes Mb, Mc are released from the movable die 102 for removal out of the die (see FIG. 20).

Whilst, the lower half molded in a cavity defined by molding portion 140B (male) and molding portion 120B (female) remains as it is in the molding portion 120B of the stationary die 101, and the upper half molded in a cavity defined by molding portion 140C (female)/molding portion 120C (male) remains as it is in the molding portion 140C of the movable die 102.

The rotor 113 of the stationary die 101 is caused to rotate 120 degrees in a direction shown by a solid line arrow in FIG. 22, and thereafter the movable die 102 is caused to advance for closure with the stationary die 101. Then, die clamping is carried out. In this connection, the condition of engagement between guide drive plate 37 and the slide guide 34 is to be changed over.

Where the stationary die 101 in such rotational condition is put in combination with the movable die 102, combinations of the molding portions of the dies 101 and 102 are as follows:

movable die, molding portion 140A (female)/stationary die, molding portion 120C (male)

movable die, molding portion 140B (male)/stationary die, molding portion 120A (female)

movable die, molding portion 140C (female)/stationary die, molding portion 120B (female)

In this case, as already mentioned, lower half and upper half are respectively left in the molding portion 120B of the stationary die 101 and in the molding portion 140C of the movable die 102; therefore, by rotating the rotor 113, the upper half and lower half are brought into abutment with each other in a cavity defined by molding portion 140C (female) and molding portion 120B (female).

In this case, changeover slot 121 of the rotor 113 of the stationary die 101 is at a rotational position shown by broken lines in FIG. 24. That is, changeover slot 121C allows primary resin passage 141A for molding portion 140A of movable die 102 to communicate with branched resin passage 143, while changeover slots 121B allows secondary resin passage 142C for molding portion 140C of movable die 102 to communicate with branched resin passage 143. The branched resin passage 143 opposed to molding portion 140B of the movable die 102 is connected to molding portion 140B by changeover slots 121A.

At the position of rotation in FIG. 24, on the side of the molding portion 140C at which secondary resin passage 142C is in communication with branched resin passage 143, core portions 133a of the first slide die 133 and core die of the second slide die 133' are pushed out and inserted into the openings of pipe ends of the molding portion 140C.

In this condition, the movable die 102 is brought into abutment with the stationary die 101, and die clamping is carried out; then melted resin is injected from a molder (not shown), whereupon the melted resin is supplied through sprues 12a to resin passages 141A, 142C, 141B which are in communication with branched resin passages 143.

In this case, a secondary resin passage 142A connected to the molding portion 140A is closed without fail by a projection 122C annexed to a male molding portion 120C of the rotor 113.

As a result, in molding cavities defined by an assembly of combinations of molding portions of stationary die 101 and movable die 102, the following molded items are produced:

molding portion 140A (female)/molding portion 120C (male): upper half of outlet pipe;
molding portion 140B (male)/molding portion 120A (female): lower half of outlet pipe;
molding portion 140C (female)/molding portion 120B (female): finished outlet pipe Mb, Mc.

It is to be noted that in the molding portion 140B (male) of the movable die 102, a lower half is constantly molded irrespective of the state of rotation of the rotor 113.

After this operation, die opening is carried out and a finished outlet pipe Mb, Mc are removed.

In this condition, rotor 113 is caused to rotate 120 degrees in reverse direction (see broken line arrow in FIG. 22) and die clamping is carried out, whereupon operation returns to its initial condition (see FIG. 22). By repeating similar steps, it is possible to obtain one set (two pieces) of finished outlet pipe Mb, Mc.

In other words, each time when the process of forward and reverse rotation of 120 degrees is repeated, die clamping, injection, and die opening are carried out. Thus, for each cycle of such rotational operation of the rotor 113, it is possible to obtain one set (two pieces) of finished products of outlet pipe Mb, Mc.

Next, construction of DRI molding die for use in the fabrication (molding) of outlet pipes Ma, Md and operation thereof will be described.

The outlet pipes Ma, Md are laterally symmetrical bent pipes and their longitudinal axes, at respective both ends thereof, form a specified angle α of about 180° or more (in the present embodiment α=about 270°; see FIG. 4) as viewed in side elevation in which respect the outlet pipes are similar to outlet pipes Mb, Mc as viewed in side elevation. In the case of the outlet pipes Mb, Mc, they are bent approximately within one plane. However, the outlet pipe Ma; Md is different from outlet pipe Mb, Mc in that the bend is not a mere bend formed within a single plane but a bend formed three dimensionally (that is, with a twist applied).

Except such a three dimensional feature, the molding die assembly for outlet pipe Ma; Md is similar to that for outlet pipe Mb; Mc in construction and manner of operation, such as open/close operation. Therefore, detailed illustration and explanation corresponding to FIGS. 17 to 21 are omitted.

Further, the outlet pipes Ma, Md are molded in the form of two pipe Ma, Md are molded in one set in the same way as in the case of molding of above described outlet pipe Mb, Mc.

Figure 25:
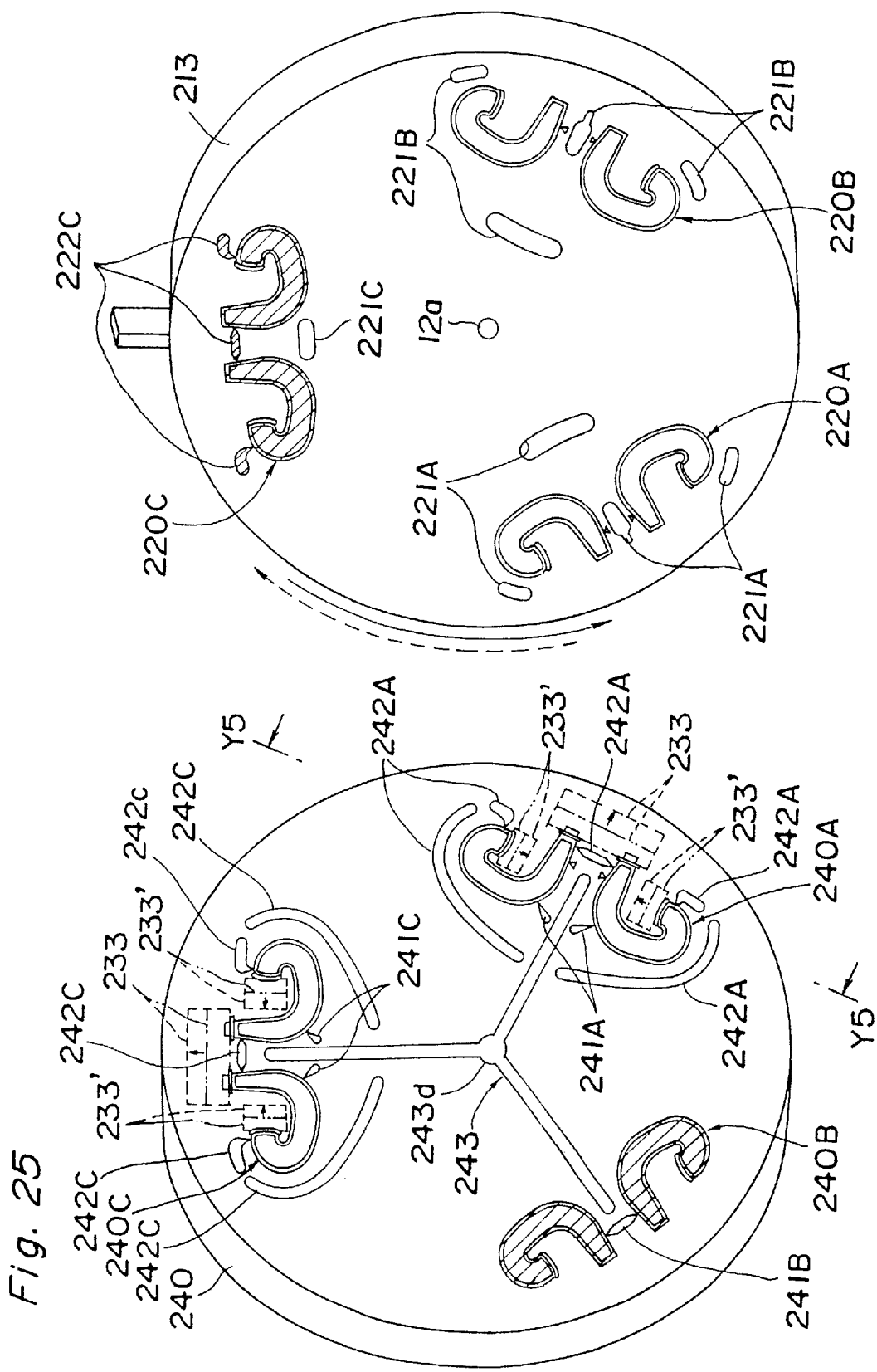
FIG. 25 is an explanatory view in front elevation of a mold for molding other outlet pipe of the intake manifold showing a stationary rotor and a movable die plate in opened condition.
Figure 26:
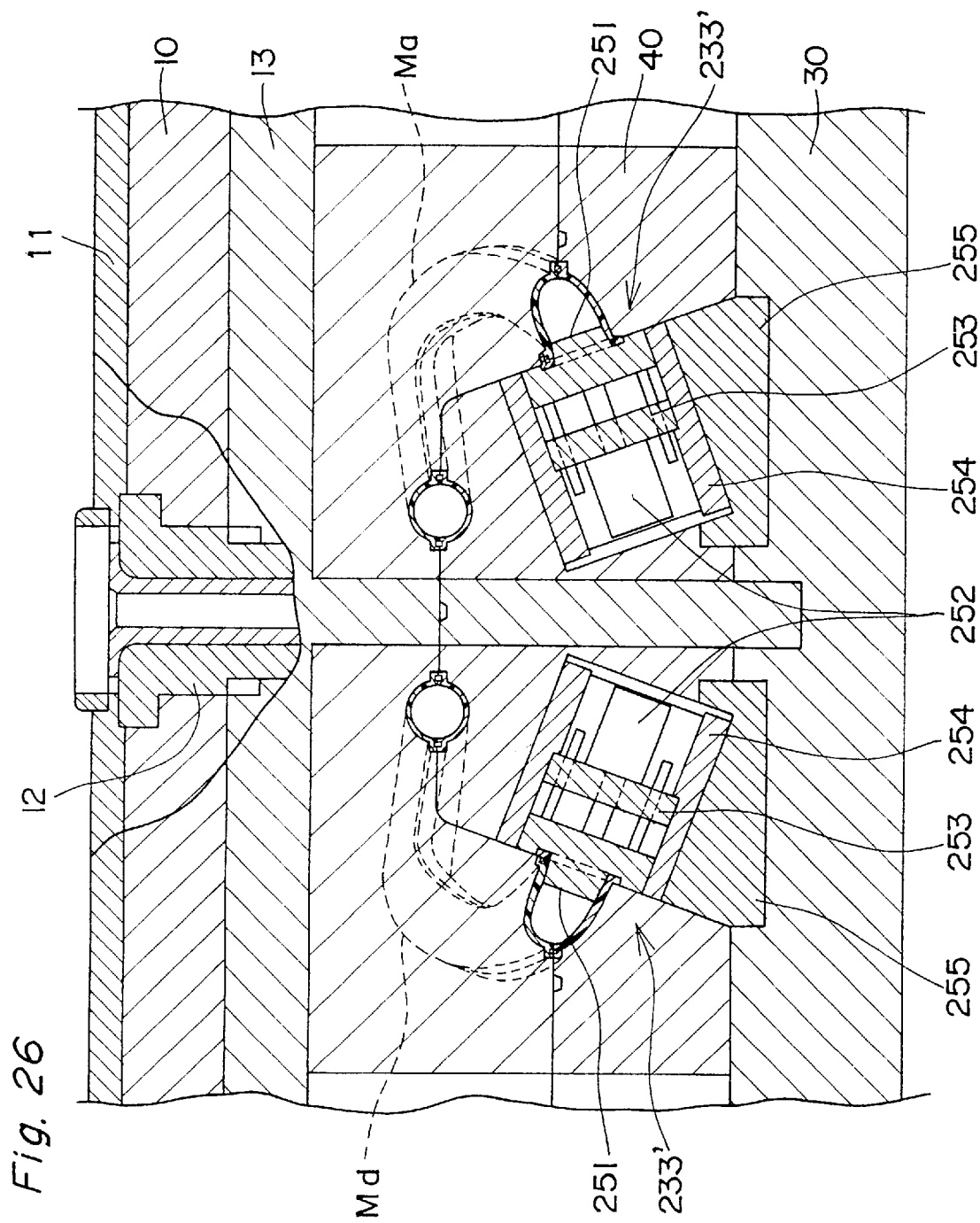
FIG. 26 is an enlarged explanatory view in longitudinal section taken along line Y5—Y5 in FIG. 25 which shows the mold for molding above mentioned other outlet pipe.

FIG. 25 is an explanatory view showing a rotor 213 of stationary die (at right side in FIG. 25) and a die plate 240 of movable die (at left side in FIG. 25) in die opening condition. FIG. 26 is an explanatory view in section taken along line Y5—Y5 in FIG. 25.

As shown in these figures, rotor 213 includes three molding portions 220A, 220B, and 220C which are arranged circumferentially equally angled relation. The molding portion 220C is a male molding portion (indicated by oblique hatching in FIG. 25) formed in a convex shape, and molding portions 220A, 220B are both female molding portions formed in a concave shape.

On the surface of a center projection of the rotor 113, there is provided a group of changeover slots 221 (221A, 221B, 221C) mainly of groove shape, for switching the connection between a resin passage connected to a molding portion of movable die and a sprue 12a of sprue bushing 12. The changeover slots 221 are respectively provided adjacent or in communication with corresponding molding portions. A projection 222C is provided in a male molding portion 220C.

As may be appreciated from the drawings, each molding portion is constituted so that upper and lower halves or a finished item of two pipes Ma, Md arranged in laterally (right and left) symmetrical relation as a set can be molded.

Drive mechanism and rotation control of the rotor 113 are same as in the case of molding die assembly for surge tank or outlet pipes Mb, Mc.

Whilst, the die plate 140 includes three molding portions 240A, 240B, and 240C arranged circumferentially equally angled relation (that is, at an angle of 120° each).

The molding portion 240B is a male molding portion formed in a convex shape, and molding portions 240A, 240C are both female molding portions formed in a concave shape. That is, the movable die includes one male molding portion 240B and two female molding portions 240A, 240C, and they are arranged in the order of male/female/female at angular intervals of 120° in the circumferential direction of the die plate 240.

On the die plate 240 of the movable die, there are provided two kinds of resin passages, that is, primary and secondary resin passages 241 (241A, 241B, 241C) and 242 (242A, 242C) which are connected directly to molding portions 240A, 240B, 240C, and branched resin passages 243 formed in branched fashion in a central cylinder portion 240d of the die plate 240.

Primary resin passages 241A, 241C which supply primary resin for molding halves are connected to molding portions 240A, 240C, and secondary resin passages 242A, 242C which supply secondary resin for joining abutted upper and lower halves are provided adjacent thereto. Whilst, primary resin passage 241B only is connected to male molding portion 240B.

The branched resin passage 243 is branched from a center portion 243d corresponding to sprue 12a of sprue bushing 12 when movable die is closed in relation to stationary die, so that three branched portions are provided in corresponding relation to primary and secondary resin passages 241

(241A, 241B, 241C) and 242 (242A, 242C) which are connected to female die molding portions 240A, 240C.

Each branched portion, at its front end, is positioned at a predetermined distance from a location adjacent one end of the corresponding resin passage.

When movable die is closed in relation to the stationary die, a specified resin passage is connected by a changeover slot 221 provided on the rotor 213 of the stationary die to branched resin passage 243 (that is, sprue 12a). This connection can be changed by the rotation of the rotor 213.

In FIG. 25, schematically shown outside the female molding portions 240A, 240C are advance position (double-dash chain line) and retreat position (broken line) of a first slide die 233 and a second slide die 233'.

As FIG. 26 shows, the second slide die 233' are embedded in movable die 240, each of them includes a core die 251 to be inserted into and removed from an end opening of outlet pipe Ma or Md on the side of its engagement with the surge tank, and a cylinder 252 for moving the core die forward and backward. The cylinder 252 is supported on a support plate 254 through a mounting plate 253. The support plate 254 is fixed to a base plate 255.

The core die 251 of the second slide die 233' is preferably adapted to be moved forward and backward almost simultaneously with the first slide die 233 or with slight delay.

The molding process for molding outlet pipes Ma, Md by using a molding die constructed as above described is carried out in the same way as in the case of the molding process for outlet pipe Mb, Mc, illustrated in FIGS. 17 to 24.

In other words, each time when a cycle of forward and backward pivoting of rotor 213 for 120° is repeated, die clamping, injection, and die opening are carried out, so that one set of outlet pipes Ma, Md (two pipes) can be obtained as finished products.

After surge tank Mt, outlet pipes Mb, Mc and Ma, Md are individually injection molded by DRI molding method in manner as above described, one surge tank Mt, one set of (two pipes) outlet pipes Mb, Mc, and one set of (two pipes) outlet pipes Ma, Md are assembled together into unity, as illustrated in FIG. 5, to form an intake manifold as shown in FIGS. 1 to 3.

For jointing the surge tank Mt and the outlet pipes Mb, Mc and Ma, Md, various known methods, such as vibration fusing, thermo-welding, a thermal fusing method using a ring shaped conductor, or a joining method using an adhesive, may be employed.

As explained above, according to the preferred embodiment of the invention, surge tank Mt and individual outlet pipes Ma–Md are separately injection molded by a so-called die rotary injection (DRI) method, and then the former and the latter are assembled and joined together into unity. Therefore, the DRI method can be comparatively easily employed in manufacturing the surge tank Mt and individual outlet pipes Ma–Md which are to be made of synthetic resin without involving any difficulty (that is, without involving any impractical size increase with respect to the molding die). This makes it possible to steadily obtain higher productivity and higher quality as compared with the prior art.

Further, since the surge tank Mt and outlet pipes Ma–Md are separately molded, where only surge tank or outlet pipes Ma–Md are to be changed in design, it is only necessary to change separate molding dies, and this provides for design flexibility with respect to intake manifold M. Therefore, for common use of a particular component, for example, surge tank Mt, with outlet pipes Ma–Md only changed, thereby to promote common utilization of the component with other types of vehicles, it can be comparatively easily achieved with a smaller cost of molding die. Furthermore, the present invention is adapted for ready application even where outlet pipes Ma–Md are bent pipes of a complex shape.

Although the above described embodiments relate to the case in which the so-called DRI method is applied in molding surge tank Mt, and outlet pipes Mb, Mc and Ma, Md, the intake manifold of the present invention is not limited to be manufactured by such a manufacturing method, and can be effectively employed in case where the so-called DSI method is used with respect to above mentioned components.

It is to be noted that the present invention is not limited to above described embodiment, and various improvements and/or design changes can be made without departing from the spirit and scope of the present invention.

What is claimed is:

1. A method of manufacturing a synthetic resin-made intake manifold comprising a volumetric air-intake section communicating with an intake air supply source through an inlet pipe, and a plurality of outlet pipes connected at one end to cylinders of an internal combustion engine through a mounting member and at the other end to the volumetric air-intake section, the volumetric air-intake section and the outlet pipes being formed of a synthetic resin, wherein the volumetric air-intake section and the outlet pipes are separately formed by injection molding and are then assembled and jointed into unity, wherein the mounting flange is integrally formed with the volumetric air-intake section during the process of injection molding of the volumetric air-intake section; and wherein a flange face of the mounting flange is substantially parallel to an axis of the inlet pipe; and wherein each of the outlet pipes is formed of a bent pipe and opposite ends of its axis form an angle of at least about 180 degrees in a bending direction of the outlet pipe.

2. A method as claimed in claim 1, wherein the injection molding is a die rotary injection method.

3. A method as claimed in claim 1, wherein the injection molding is a die slide injection method.

4. A synthetic resin-made intake manifold comprising a volumetric air-intake section communicating with an intake air supply source through an inlet pipe, and a plurality of outlet pipes connected at one end to cylinders of an internal combustion engine through a mounting member and at the other end to the volumetric air-intake section, the volumetric air-intake section and the outlet pipes being formed of a synthetic resin, wherein the volumetric air-intake section and the outlet pipes are separately formed by injection molding and are then assembled and jointed into unity, wherein the mounting flange is integrally formed with the volumetric air-intake section; and wherein a flange face of the mounting flange is substantially parallel to an axis of the inlet pipe; and wherein each of the outlet pipes is formed of a bent pipe and opposite ends of its axis form an angle of at least about 180 degrees in a bending direction of the outlet pipe.

5. A synthetic resin-made intake manifold as claimed in claim 4, wherein the injection molding is a die rotary injection method.

6. A synthetic resin-made intake manifold as claimed in claim 4, wherein the injection molding is a die slide injection method.

* * * * *